United States Patent
Lei et al.

(10) Patent No.: US 11,678,375 B2
(45) Date of Patent: Jun. 13, 2023

(54) RANDOM ACCESS RESPONSE TYPE DIFFERENTIATION

(71) Applicant: QUALCOMM Incorporated, San Diego, CA (US)

(72) Inventors: Jing Lei, San Diego, CA (US); Huilin Xu, San Diego, CA (US); Yuanning Yu, Santa Clara, CA (US); Hongsan Sheng, San Diego, CA (US); Enoch Shiao-Kuang Lu, San Diego, CA (US); Subramanya Rao, Sunnyvale, CA (US); Omar Mehanna, San Diego, CA (US); Linhai He, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/069,584

(22) Filed: Oct. 13, 2020

(65) Prior Publication Data

US 2021/0120594 A1 Apr. 22, 2021

Related U.S. Application Data

(60) Provisional application No. 62/923,277, filed on Oct. 18, 2019.

(51) Int. Cl.
*H04W 74/08* (2009.01)
*H04W 72/23* (2023.01)

(52) U.S. Cl.
CPC ....... *H04W 74/0833* (2013.01); *H04W 72/23* (2023.01)

(58) Field of Classification Search
CPC . H04W 74/08; H04W 72/04; H04W 74/0833; H04W 72/042
See application file for complete search history.

(56) References Cited

U.S. PATENT DOCUMENTS

2020/0146054 A1\* 5/2020 Jeon .................. H04L 5/0053
2020/0351955 A1\* 11/2020 Jeon .................. H04L 5/0053

(Continued)

OTHER PUBLICATIONS

CATT: "Reception of Msg2 and msgB", 3GPP Draft, 3GPP TSG-RAN2 Meeting #106, R2-1905754—Reception of Msg2 and msgB, 3rd Generation Partnership Project (3GPP), Mobile Competence Centre, 650, Route Des Lucioles, F-06921, Sophia-Antipolis Cedex, France, vol. RAN WG2. No. Reno. USA, May 13, 2019-May 17, 2019, May 13, 2019 (May 13, 2019), XP051729253, pp. 1-6, Retrieved from the Internet: URL: http://www.3gpp.org/ftp/Meetings%5F3GPP%5FSYNC/RAN2/Docs/R2%2D1905754%2Ezip [retrieved on May 13, 2019] Sections 2.2. 2.3.

(Continued)

*Primary Examiner* — Chi Ho A Lee
*Assistant Examiner* — Andrew Lee
(74) *Attorney, Agent, or Firm* — Qualcomm Incorporated

(57) ABSTRACT

Various aspects of the present disclosure generally relate to wireless communication. In some aspects, a user equipment may receive configuration information that indicates a transmission parameter associated with a random access response (RAR) type; transmit a random access message associated with the RAR type; use the transmission parameter to obtain a physical downlink control channel (PDCCH) communication that schedules a physical downlink shared channel (PDSCH) communication that includes a RAR in a medium access control protocol data unit of the PDSCH communication; and obtain or refraining from obtaining the PDSCH communication based at least in part on whether the PDCCH communication is successfully obtained using the transmission parameter. Numerous other aspects are provided.

30 Claims, 11 Drawing Sheets

(56) References Cited

U.S. PATENT DOCUMENTS

| | | | | |
|---|---|---|---|---|
| 2020/0396633 | A1* | 12/2020 | Tseng | H04W 24/10 |
| 2021/0007146 | A1* | 1/2021 | Agiwal | H04W 24/04 |
| 2021/0051736 | A1* | 2/2021 | Jeon | H04W 76/18 |
| 2021/0127351 | A1* | 4/2021 | Stojanovski | H04W 48/16 |
| 2022/0046720 | A1* | 2/2022 | Wu | H04W 74/0833 |
| 2022/0061106 | A1* | 2/2022 | Zhang | H04W 74/0841 |
| 2022/0078856 | A1* | 3/2022 | Jeon | H04W 74/0841 |
| 2022/0124711 | A1* | 4/2022 | Zhou | H04W 28/26 |
| 2022/0182877 | A1* | 6/2022 | Zhang | H04W 28/0289 |

OTHER PUBLICATIONS

CMCC: "Discussion on Procedure for 2-Step RACH", 3GPP Draft, 3GPP TSG RAN WG1 #98, R1-1908861, 3rd Generation Partnership Project (3GPP), Mobile Competence Centre, 650, Route Des Lucioles, F-06921 Sophia-Antipolis Cedex, France, vol. RAN WG1, No. Prague. CZ, Aug. 26, 2019-Aug. 30, 2019, Aug. 16, 2019 (Aug. 16, 2019), XP051765469, pp. 1-6, Retrieved from the Internet: URL: http://www.3gpp.org/ftp/tsg_ran/WG1_RL1/TSGR1_98/Docs/R1-1908861.zip, [retrieved on Aug. 16, 2019], Sections 2.1 and 2.2, figure 1.

FUJITSU: "Discussion on Procedure for2-Step Rach", 3GPP Draft, 3GPP TSG-RAN WG1 Meeting #98bis, R1-1910127 Discussion on Procedure for2-Step RACH, 3rd Generation Partnership Project (3GPP), Mobile Competence Centre, 650, Route Des Lucioles, F-06921 Sophia-Antipolis Cedex, France, vol. RAN WG1. No. Chongqing, China, Oct. 14, 2019-Oct. 20, 2019, Oct. 4, 2019 (Oct. 4, 2019), XP051808081, pp. 1-4, Retrieved from the Internet: URL: https://ftp.3gpp.org/tsg_ran/WG1_RL1/TSGR1_98b/Docs/R1-1910127.zip R1-1910127 Discussion on procedure for 2-step RACH.docx, [retrieved on Oct. 4, 2019], p. 2, figure 1.

International Search Report and Written Opinion—PCT/US2020/055524—ISAEPO—dated Dec. 11, 2020.

RAN2: "LS on SFN LSB Indication in msg2/msgB", 3GPP Draft, 3GPP TSG-RAN WG2 Meeting #107bis, R2-1914064_LS_NRU_SFN, 3rd Generation Partnership Project (3GPP), Mobile Competence Centre, 650, Route Des Lucioles, F-06921 Sophia-Antipolis Cedex, France, vol. RAN WG2. No. Chongqing, China, Oct. 14, 2019-Oct. 18, 2019, Oct. 17, 2019 (Oct. 17, 2019), XP051796887, pp. 1-2, Retrieved from the Internet: URL: https://ftp.3gpp.org/Meetings_3GPP_SYNC/RAN2/LSout/R2-1914064.zip R2-1914064-LS_NRU_SFN.Docx, [retrieved on Oct. 17, 2019], the whole document.

* cited by examiner

RANDOM ACCESS RESPONSE TYPE DIFFERENTIATION

CROSS-REFERENCE TO RELATED APPLICATION

This patent application claims priority to U.S. Provisional Patent Application No. 62/923,277, filed on Oct. 18, 2019, entitled "RANDOM ACCESS RESPONSE TYPE DIFFERENTIATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for random access response type differentiation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving configuration information that indicates a transmission parameter associated with a random access response (RAR) type; transmitting a random access message associated with the RAR type; using the transmission parameter to obtain a physical downlink control channel (PDCCH) communication that schedules a physical downlink shared channel (PDSCH) communication that includes a RAR; and obtaining or refraining from obtaining the PDSCH communication based at least in part on whether the PDCCH communication is successfully obtained using the transmission parameter.

In some aspects, a method of wireless communication, performed by a UE, may include determining a system frame number (SFN) of a random access channel occasion to be monitored by the UE; using a least significant bit (LSB) of the SFN to identify a RAR type of a RAR scheduled by a PDCCH communication; and obtaining the PDCCH communication or performing early termination of reception of the PDCCH communication based at least in part on the RAR type.

In some aspects, a method of wireless communication, performed by a base station, may include transmitting configuration information that indicates a transmission parameter associated with a RAR type; receiving a random access message associated with the RAR type; and using the transmission parameter to transmit a PDCCH communication that schedules a PDSCH communication that includes the RAR.

In some aspects, a method of wireless communication, performed by a base station, may include determining an SFN of a random access channel occasion; using an LSB of the SFN to indicate a RAR type of a RAR scheduled by a PDCCH communication; and transmitting the PDCCH communication.

In some aspects, a UE for wireless communication may include memory and one or more processors operatively coupled to the memory. The memory and the one or more processors may be configured to receive configuration information that indicates a transmission parameter associated with a RAR type; transmit a random access message associated with the RAR type; use the transmission parameter to obtain a PDCCH communication that schedules a PDSCH communication that includes a RAR; and obtain or refrain from obtaining the PDSCH communication based at least in part on whether the PDCCH communication is successfully obtained using the transmission parameter.

In some aspects, a UE for wireless communication may include memory and one or more processors operatively coupled to the memory. The memory and the one or more processors may be configured to determine an SFN of a random access channel occasion to be monitored by the UE; use an LSB of the SFN to identify a RAR type of a RAR scheduled by a PDCCH communication; and obtain the PDCCH communication or perform early termination of reception of the PDCCH communication based at least in part on the RAR type.

In some aspects, a base station for wireless communication may include memory and one or more processors operatively coupled to the memory. The memory and the one or more processors may be configured to transmit configuration information that indicates a transmission parameter associated with a RAR type; receive a random access message associated with the RAR type; and use the transmission parameter to transmit a PDCCH communication that schedules a PDSCH communication that includes the RAR.

In some aspects, a base station for wireless communication may include memory and one or more processors operatively coupled to the memory. The memory and the one or more processors may be configured to determine an SFN of a random access channel occasion; use an LSB of the SFN to indicate a RAR type of a RAR scheduled by a PDCCH communication; and transmit the PDCCH communication.

In some aspects, a non-transitory computer-readable medium may store one or more instructions for wireless communication. The one or more instructions, when executed by one or more processors of a UE, may cause the one or more processors to: receive configuration information that indicates a transmission parameter associated with a RAR type; transmit a random access message associated with the RAR type; use the transmission parameter to obtain a PDCCH communication that schedules a PDSCH communication that includes a RAR; and obtain or refrain from obtaining the PDSCH communication based at least in part on whether the PDCCH communication is successfully obtained using the transmission parameter.

In some aspects, a non-transitory computer-readable medium may store one or more instructions for wireless communication. The one or more instructions, when executed by one or more processors of a UE, may cause the one or more processors to: determine an SFN of a random access channel occasion to be monitored by the UE; use an LSB of the SFN to identify a RAR type of a RAR scheduled by a PDCCH communication; and obtain the PDCCH communication or perform early termination of reception of the PDCCH communication based at least in part on the RAR type.

In some aspects, a non-transitory computer-readable medium may store one or more instructions for wireless communication. The one or more instructions, when executed by one or more processors of a base station, may cause the one or more processors to: transmit configuration information that indicates a transmission parameter associated with a RAR type; receive a random access message associated with the RAR type; and use the transmission parameter to transmit a PDCCH communication that schedules a PDSCH communication that includes the RAR.

In some aspects, a non-transitory computer-readable medium may store one or more instructions for wireless communication. The one or more instructions, when executed by one or more processors of a base station, may cause the one or more processors to: determine an SFN of a random access channel occasion; use an LSB of the SFN to indicate a RAR type of a RAR scheduled by a PDCCH communication; and transmit the PDCCH communication.

In some aspects, an apparatus for wireless communication may include means for receiving configuration information that indicates a transmission parameter associated with a RAR type; means for transmitting a random access message associated with the RAR type; means for using the transmission parameter to obtain a PDCCH communication that schedules a PDSCH communication that includes a RAR; and means for obtaining or refraining from obtaining the PDSCH communication based at least in part on whether the PDCCH communication is successfully obtained using the transmission parameter.

In some aspects, an apparatus for wireless communication may include means for determining an SFN of a random access channel occasion to be monitored by the apparatus; means for using an LSB of the SFN to identify a RAR type of a RAR scheduled by a PDCCH communication; and means for obtaining the PDCCH communication or performing early termination of reception of the PDCCH communication based at least in part on the RAR type.

In some aspects, an apparatus for wireless communication may include means for transmitting configuration information that indicates a transmission parameter associated with a RAR type; means for receiving a random access message associated with the RAR type; and means for using the transmission parameter to transmit a PDCCH communication that schedules a PDSCH communication that includes the RAR.

In some aspects, an apparatus for wireless communication may include means for determining an SFN of a random access channel occasion; means for using an LSB of the SFN to indicate a RAR type of a RAR scheduled by a PDCCH communication; and means for transmitting the PDCCH communication.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
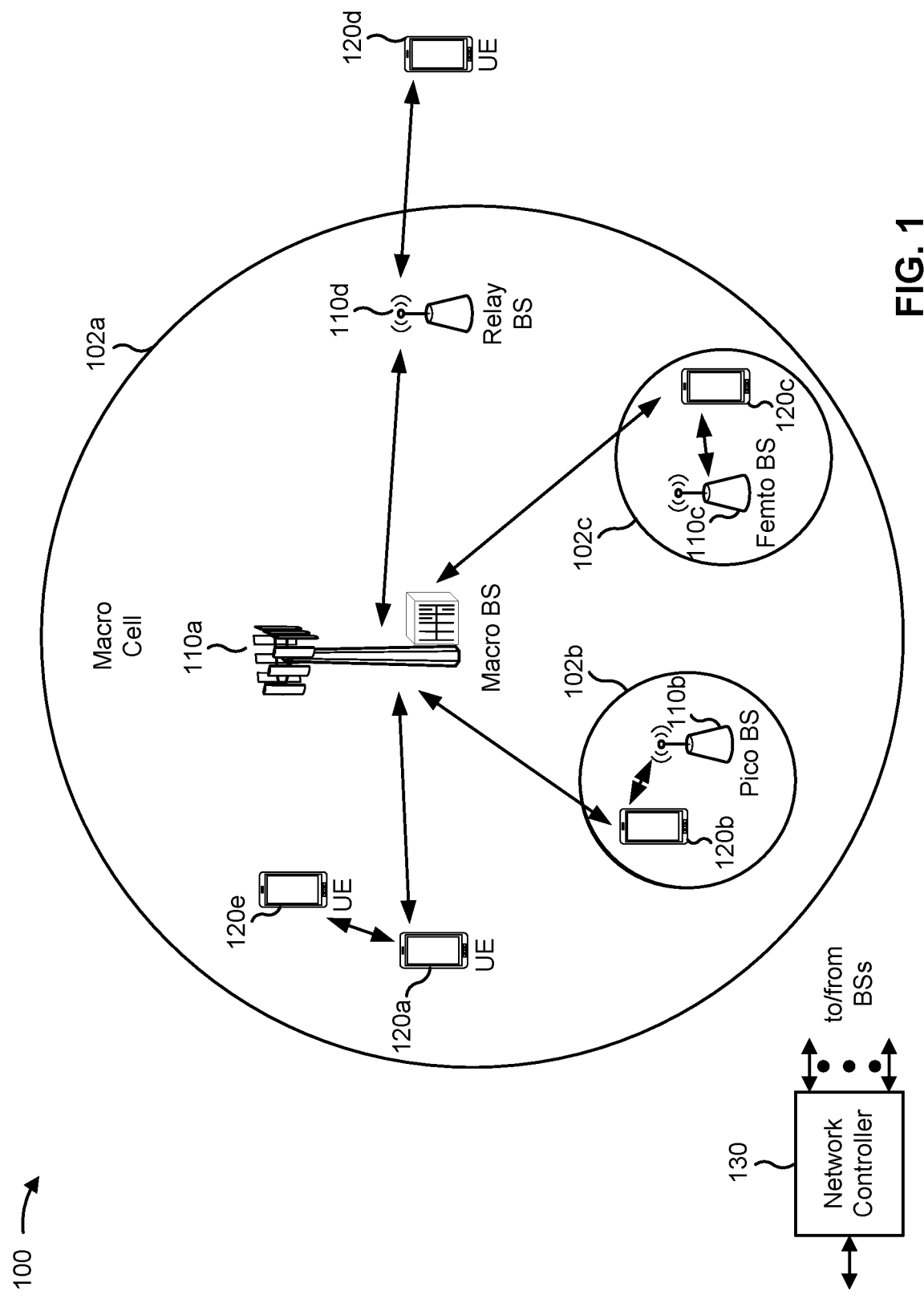
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
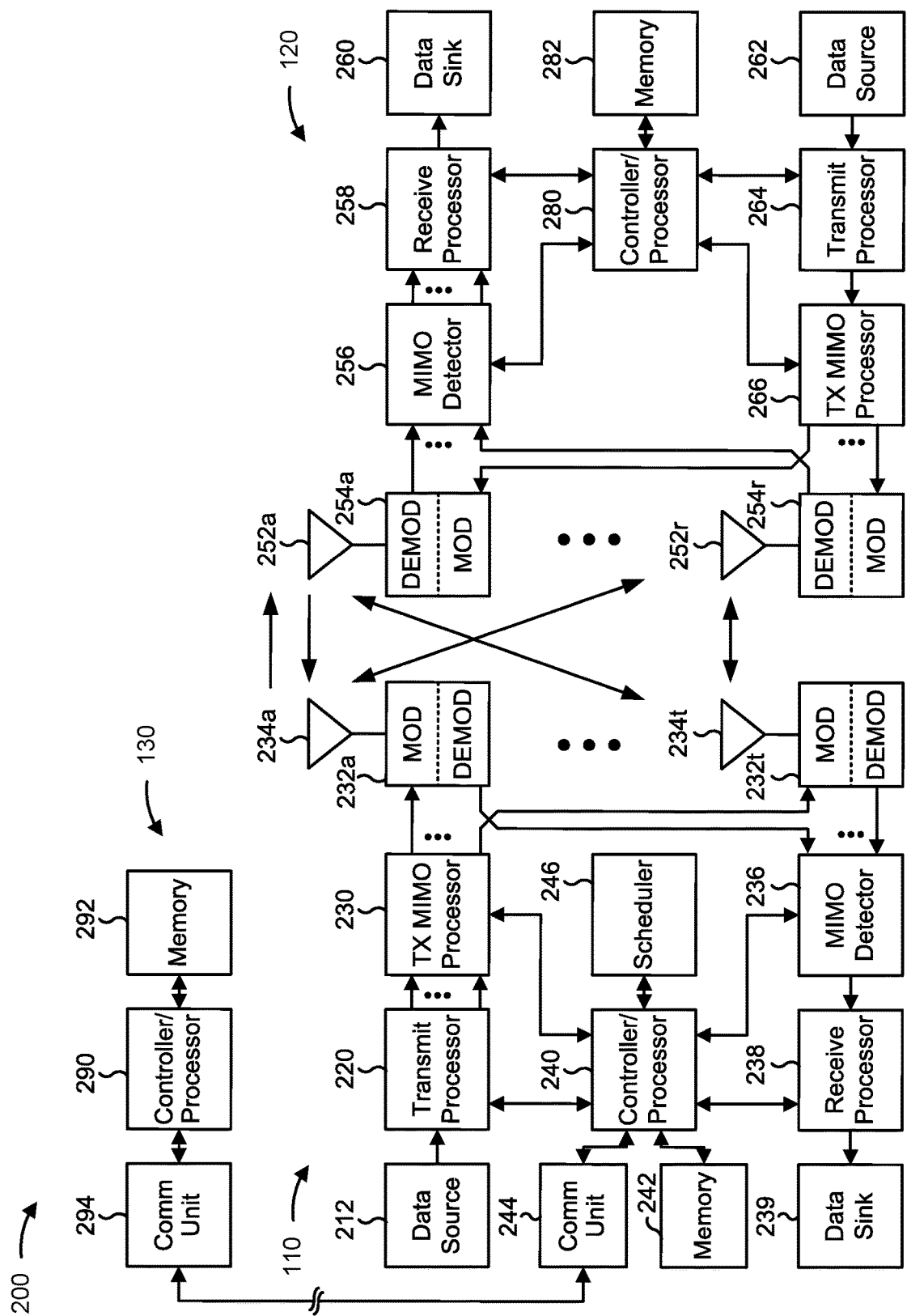
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with random access response type differentiation, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, process 1000 of FIG. 10, process 1100 of FIG. 11, and/or other processes as described herein. A scheduler 246 may schedule UEs for data transmission on the downlink and/or uplink.

In some aspects, UE 120 may include means for receiving configuration information that indicates a transmission parameter associated with a random access response (RAR) type; means for transmitting a random access message associated with the RAR type; means for using the transmission parameter to obtain a physical downlink control channel (PDCCH) communication that schedules a physical downlink shared channel (PDSCH) communication that includes a RAR; means for obtaining or refraining from obtaining the PDSCH communication based at least in part on whether the PDCCH communication is successfully obtained using the transmission parameter; and/or the like. Additionally, or alternatively, UE 120 may include means for determining a system frame number (SFN) of a random access channel occasion to be monitored by the UE 120; means for using a least significant bit (LSB) of the SFN to identify a RAR type of a RAR scheduled by a PDCCH communication; means for obtaining the PDCCH communication or performing early termination of reception of the PDCCH communication based at least in part on the RAR type; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting configuration information that indicates a transmission parameter associated with a RAR type; means for receiving a random access message associated with the RAR type; means for using the transmission parameter to transmit a PDCCH communication that schedules a PDSCH communication that includes the RAR; and/or the like. Additionally, or alternatively, base station 110 may include means for determining an SFN of a random access channel occasion; means for using an LSB of the SFN to indicate a RAR type of a RAR scheduled by a PDCCH communication; means for transmitting the PDCCH communication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
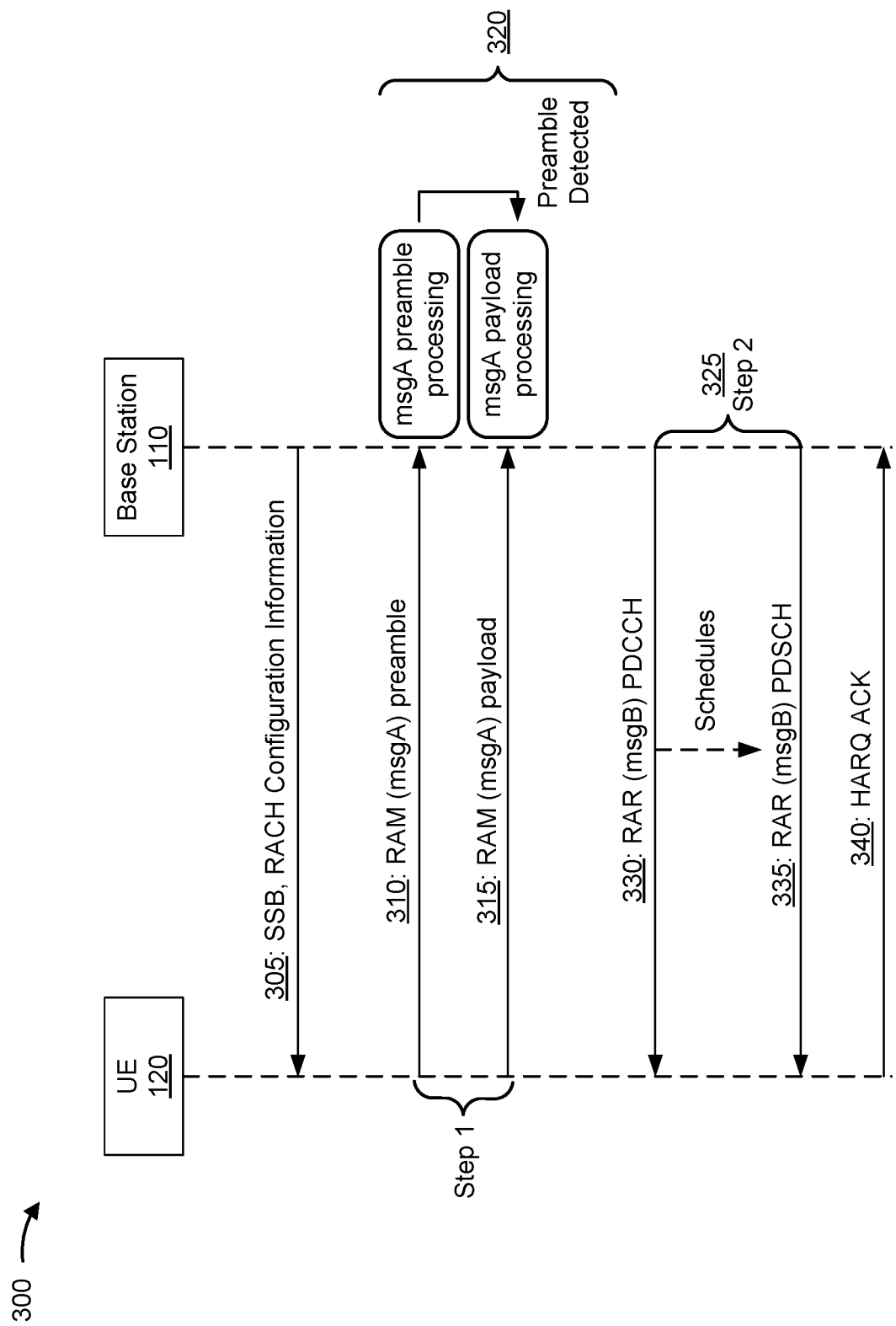
FIG. 3 is a diagram illustrating an example of a two-step random access channel (RACH) procedure.

FIG. 3 is a diagram illustrating an example 300 of a two-step random access channel (RACH) procedure. As shown in FIG. 3, a base station 110 and a UE 120 may communicate with one another to perform the two-step RACH procedure.

As shown by reference number 305, the base station 110 may transmit, and the UE 120 may receive, one or more synchronization signal blocks (SSBs) and RACH configuration information. In some aspects, the RACH configuration information may be transmitted in and/or indicated by system information (e.g., in one or more system information blocks (SIBs) and/or the like) and/or an SSB. Additionally, or alternatively, the RACH configuration information may be transmitted in a radio resource control (RRC) message. The RACH configuration information may include one or more parameters to be used in the RACH procedure, such as one or more parameters for transmitting a random access message (RAM), one or more parameters for receiving a RAR, and/or the like.

As shown by reference number 310, the UE 120 may transmit a RAM preamble. As shown by reference number 315, the UE 120 may transmit a RAM payload. As shown, the UE 120 may transmit the RAM preamble and the RAM payload as part of a first step of the two-step RACH procedure. The RAM is sometimes referred to as message A, msgA, or a first message in a two-step RACH procedure. The RAM preamble is sometimes referred to as a message A preamble, a msgA preamble, or a preamble. The RAM payload is sometimes referred to as a message A payload, a msgA payload, or a payload. The RAM may include some or all of the contents of message 1 (msg1) and message 3 (msg3) of a four-step RACH procedure. For example, the RAM preamble may include some or all contents of message 1 (such as a RACH preamble). The RAM payload may include some or all contents of message 3 (such as a UE identifier, uplink control information, a physical uplink shared channel (PUSCH) communication, and/or the like).

As shown by reference number 320, the base station 110 may receive the RAM preamble transmitted by the UE 120. If the base station 110 successfully receives and decodes the RAM preamble, the base station 110 may then receive and decode the RAM payload.

As shown by reference number 325, the base station 110 may transmit a RAR (sometimes referred to as a RAR message). As shown, the base station 110 may transmit the RAR message as part of a second step of the two-step RACH procedure. The RAR message is sometimes referred to as message B, msgB, or a second message in a two-step RACH procedure. The RAR message may include some or all of the contents of message 2 (msg2) and message 4 (msg4) of a four-step RACH procedure. For example, the RAR message may include the detected RACH preamble identifier, the detected UE identifier, a timing advance value, contention resolution information, and/or the like.

As shown by reference number 330, as part of the second step of the two-step RACH procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 335, as part of the second step of the two-step RACH procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 340, if the UE 120 successfully receives the RAR, the UE 120 may transmit a hybrid automatic repeat request (HARQ) acknowledgement (ACK).

As indicated above, FIG. 3 is provided as an example. Other examples may differ from what is described with regard to FIG. 3.

Figure 4:
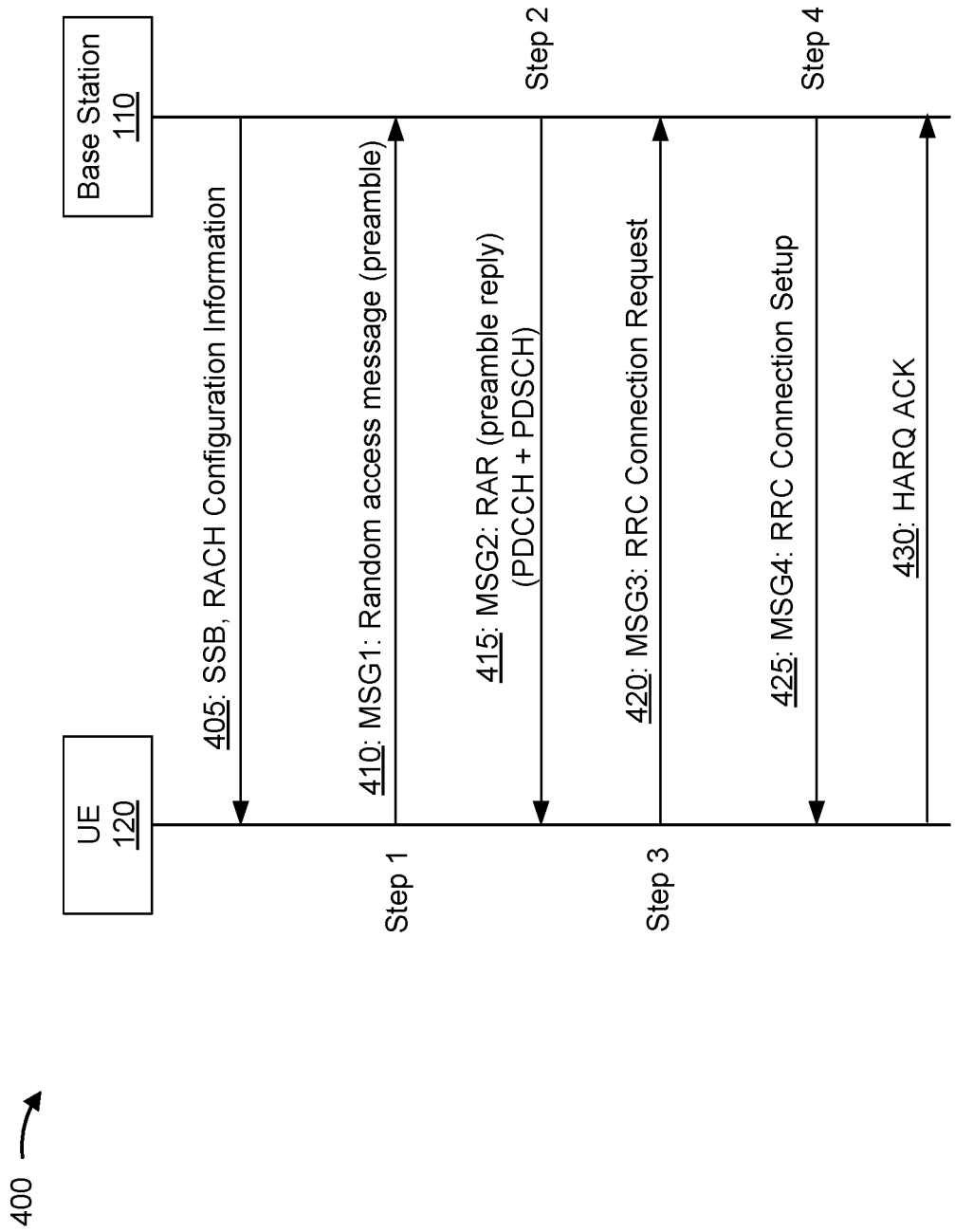
FIG. 4 is a diagram illustrating an example of a four-step RACH procedure.

FIG. 4 is a diagram illustrating an example 400 of a four-step RACH procedure. As shown in FIG. 4, a base station 110 and a UE 120 may communicate with one another to perform the four-step RACH procedure.

As shown by reference number 405, the base station 110 may transmit, and the UE 120 may receive, one or more SSBs and RACH configuration information. In some aspects, the RACH configuration information may be transmitted in and/or indicated by system information (e.g., in one or more SIBs and/or the like) and/or an SSB. Additionally, or alternatively, the RACH configuration information may be transmitted in an RRC message. The RACH configuration information may include one or more parameters to be used in the RACH procedure, such as one or more parameters for transmitting a RAM, one or more parameters for receiving a RAR, and/or the like.

As shown by reference number 410, the UE 120 may transmit a random access message, such as a random access (RA) preamble (sometimes referred to as a RACH preamble, a PRACH preamble, a RAM preamble, and/or the like). The message that includes the random access preamble may be referred to as a message 1, msg1, MSG1, or a first message of a four-step RACH procedure. The random access message may include a RACH preamble identifier.

As shown by reference number 415, the base station 110 may transmit a random access response (RAR), such as a reply to the preamble. The message that includes the preamble reply may be referred to as message 2, msg2, MSG2, or a second message of a four-step RACH procedure. In some aspects, the preamble reply may indicate the detected RACH preamble identifier (e.g., received from the UE 120 in MSG1). Additionally, or alternatively, the preamble reply may indicate a resource allocation to be used by the UE 120 to transmit message 3 (msg3).

In some aspects, as part of the second step of the four-step RACH procedure, the base station 110 may transmit a PDCCH communication for the RAR. The PDCCH communication may schedule a PDSCH communication that includes the RAR. For example, the PDCCH communication may indicate a resource allocation for the PDSCH communication. Also as part of the second step of the four-step RACH procedure, the base station 110 may transmit the PDSCH communication for the RAR, as scheduled by the PDCCH communication. The RAR may be included in a MAC PDU of the PDSCH communication.

As shown by reference number 420, the UE 120 may transmit a radio resource control (RRC) connection request message. The RRC connection request message may be referred to as message 3, msg3, MSG3, or a third message of a four-step RACH procedure. In some aspects, the RRC connection request may include a UE identifier, uplink control information, a PUSCH communication (e.g., an RRC connection request), and/or the like.

As shown by reference number 425, the base station 110 may transmit an RRC connection setup message. The RRC connection setup message may be referred to as message 4, msg4, MSG4, or a fourth message of a four-step RACH procedure. In some aspects, the RRC connection setup message may include the detected UE identifier, a timing advance value, contention resolution information, and/or the like. As shown by reference number 430, if the UE 120 successfully receives the RRC connection setup message, the UE 120 may transmit a HARQ ACK.

A RACH procedure, such as the 2-step RACH procedure of FIG. 3 and/or the 4-step RACH procedure of FIG. 4, may be triggered by a variety of events and/or may be used in a variety of scenarios. For example, a RACH procedure may be used for initial network access (e.g., from an RRC idle state), may be used for RRC connection re-establishment, may be used for indicating or obtaining on-demand system information, may be used for a beam failure recovery procedure, may be used for synchronous configuration, may be used for scheduling request failure, may be used for handover, and/or the like. These different RACH use cases may be associated with different priorities. In some cases, different random access modes, such as 2-step RACH or 4-step RACH, may be used. Furthermore, different UEs 120 may have different capabilities for performing a RACH procedure.

As a result, there are a variety of different RAR types (e.g., different types of RARs) that may be used in the RACH procedure, such as for different random access modes, different UE capabilities, different priorities, different lengths of a RAR window, and/or the like. In some cases, different types of RARs may be transmitted concurrently (e.g., using unicast or multicast transmission), such as in the same time resource (e.g., overlapping time resources or identical time resources), the same symbol, the same slot, the same subframe, the same radio frame, in the same RACH occasion, and/or the like. If a UE 120 shares a RACH occasion with one or more other UEs 120 (e.g., if multiple RARs are transmitted concurrently), then the UE 120 may need to decode multiple PDCCHs and/or multiple PDSCHs corresponding to the multiple RARs to obtain a RAR intended for the UE 120. This requires the UE 120 to perform excessive blind decoding, which consumes resources of the UE 120 (e.g., memory resources, processing resources, battery power, and/or the like). This also increases latency due to the time required to decode each PDCCH and each PDSCH. Some techniques and apparatuses described herein enable the UE 120 to differentiate between different RAR types without fully decoding all PDCCHs and/or all PDSCHs in a RACH occasion. This conserves resources of the UE 120 and reduces latency.

As indicated above, FIG. 4 is provided as an example. Other examples may differ from what is described with regard to FIG. 4.

Figure 5:
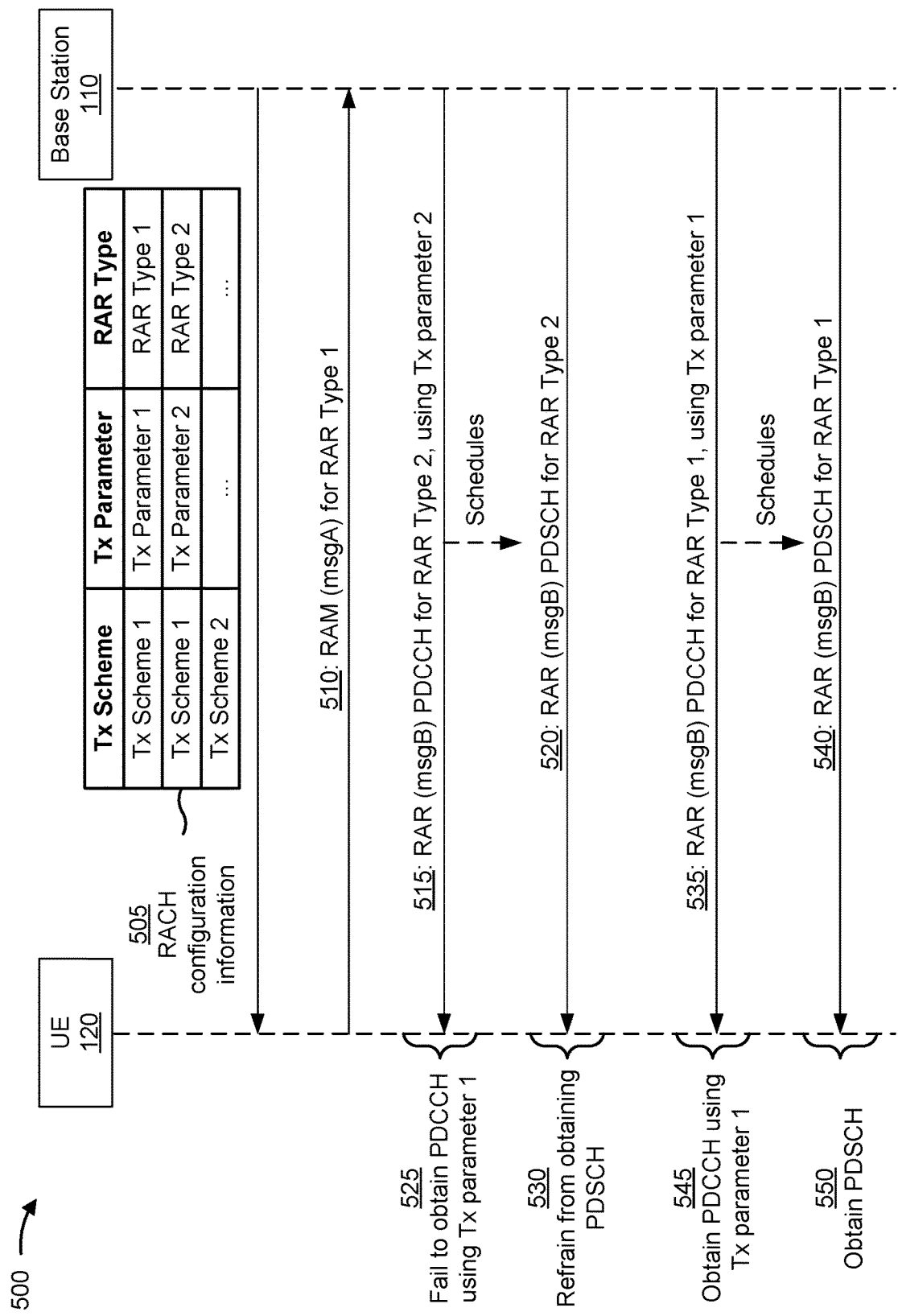
FIGS. 5-7 are diagrams illustrating examples of random access response type differentiation, in accordance with various aspects of the present disclosure.

FIG. 5 is a diagram illustrating an example 500 of random access response type differentiation, in accordance with various aspects of the present disclosure. As shown in FIG. 5, a UE 120 and a base station 110 may communicate with one another to perform a RACH procedure.

As shown by reference number 505, the base station 110 may transmit RACH configuration information to the UE 120. The RACH configuration information may indicate a transmission parameter associated with a RAR type. The transmission parameter may be associated with a transmission scheme for differentiating between different RAR types. In some aspects, the RACH configuration may indicate the transmission parameter and/or the transmission scheme. As an example, for a first transmission scheme (shown as Tx Scheme 1), the RACH configuration information may indicate a first transmission parameter (shown as Tx parameter 1) corresponding to a first RAR type (shown as RAR Type 1), a second transmission parameter (shown as Tx parameter 2) corresponding to a second RAR type (shown as RAR Type 2), and so on.

A transmission scheme may refer to a scheme used to differentiate between different RAR types. In some cases, a transmission scheme may be referred to as a RAR type indication scheme, a RAR type differentiation scheme, and/or the like. For example, a demodulation reference signal (DMRS)-based RAR type indication scheme may use different DMRS scrambling identifiers (or different sets of DMRS scrambling identifiers) to differentiate between RAR types. As another example, a radio network temporary identifier (RNTI)-based RAR type indication scheme may use different RNTIs (or different sets of RNTIs) to differentiate between RAR types. Different transmission parameters of a transmission scheme may indicate different RAR types. Other examples are provided below.

A transmission parameter may be used to indicate a RAR type. In some aspects, a transmission parameter may refer to a parameter used to prepare a PDCCH communication for transmission and/or a parameter used to recover a transmission of a PDCCH communication that is transmitted using the transmission parameter. For example, a transmission parameter may include a DMRS scrambling identifier, an antenna port mapping identifier, a DCI scrambling identifier, a CRC mask, an interleaving pattern, a control resource set (CORESET) configuration, a search space configuration, a spatial parameter, an RNTI, and/or the like. Further details and examples are provided below.

A RAR type may indicate, for example, a random access mode for a RACH procedure (e.g., a 2-step RACH mode, a 4-step RACH mode, and/or the like), a UE capability associated with a RACH procedure, a priority of a RACH procedure, a length of RAR window associated with a RACH procedure, and/or the like. Thus, different RAR types may be associated with different random access modes, different UE capabilities, different priorities, different lengths of a RAR window, and/or the like. In some aspects, a UE capability for the RACH procedure may indicate a bandwidth supported by the UE 120 (e.g., a narrowband UE capability, a wideband UE capability, one or more bandwidth parts supported by the UE 120, and/or the like), a power class of the UE 120, a tier of the UE 120 (e.g., low tier, high tier, and/or the like), whether the UE 120 supports a particular requirement (e.g., a low latency requirement, a high reliability requirement, an ultra-reliable low latency communication (URLLC) requirement, and/or the like), and/or the like. In some aspects, a priority of the RACH procedure may indicate whether the RACH procedure is associated with time-sensitive traffic (e.g., URLLC traffic), whether the RACH procedure is associated with best efforts traffic, a quality of service (QoS) requirement and/or parameter (or set of parameters) for the RACH procedure, and/or the like.

As shown by reference number 510, the UE 120 may transmit a random access message (RAM) to the base station 110. The RAM may include, for example, a RAM preamble and/or a RAM payload, as described above in connection with FIGS. 3 and 4. In a two-step RACH procedure, the RAM may be msgA. In a four-step RACH procedure, the RAM may be msg1. As shown, the RAM may be associated with a first RAR type, shown as RAR Type 1. In some aspects, the UE 120 may determine the RAR type based at least in part on an event that triggers the RACH procedure, a priority of the RACH procedure, a UE capability, a random access mode of the RACH procedure (e.g., two-step RACH or four-step RACH), and/or the like.

As shown by reference number 515, the base station 110 may transmit a PDCCH communication (e.g., a first PDCCH communication) associated with a second RAR type. For example, the PDCCH communication may schedule a PDSCH communication (e.g., a first PDSCH communication) that includes a RAR (e.g., msgB, msg2, and/or the like) having the second RAR type. When transmitting a PDCCH communication associated with the second RAR type, the base station 110 may transmit the PDCCH communication using the second transmission parameter (e.g., indicated in the RACH configuration information as being associated with the second RAR type). As shown by reference number 520, the base station 110 may transmit the PDSCH communication, including the RAR having the second RAR type, according to scheduling information indicated in the PDCCH communication. The PDSCH communication may include the RAR in a MAC PDU (or a MAC sub-PDU) of the PDSCH communication.

As shown by reference number 525, the UE 120 may use the first transmission parameter to obtain (e.g., obtain, attempt to obtain, monitor for, receive, decode, demodulate, descramble, and/or the like) the PDCCH communication. In example 500, the UE 120 uses the first transmission parameter to obtain the PDCCH communication because the UE 120 transmitted a RAM for the first RAR type, which corresponds to the first transmission parameter according to the RACH configuration information. In this case, the UE 120 fails to obtain the PDCCH communication (e.g., fails to receive, decode, demodulate, descramble, and/or the like) because the PDCCH communication is transmitted using the second transmission parameter and not the first transmission parameter. Due to failing to successfully obtain the PDCCH communication, the UE 120 determines that the PDSCH communication, scheduled by the PDCCH communication, does not include a RAR having the first RAR type.

As shown by reference number 530, the UE 120 may refrain from obtaining the PDSCH communication due to the failure to successfully obtain the PDCCH communication. In some aspects, if the transmission parameter is needed to read the PDCCH communication (e.g., in the case of a scrambling identifier and/or the like), then the UE 120 may perform early termination of reception of the PDCCH communication.

As shown by reference number 535, the base station 110 may transmit a PDCCH communication (e.g., a second PDCCH communication) associated with the first RAR type. For example, the PDCCH communication may schedule a PDSCH communication (e.g., a second PDSCH communication) that includes a RAR (e.g., msgB, msg2, and/or the like) having the first RAR type. When transmitting a PDCCH communication associated with the first RAR type, the base station 110 may transmit the PDCCH communication using the first transmission parameter (e.g., indicated in the RACH configuration information as being associated with the first RAR type). As shown by reference number 540, the base station 110 may transmit the PDSCH communication, including the RAR having the first RAR type, according to scheduling information indicated in the PDCCH communication. The PDSCH communication may include the RAR in a MAC PDU (or a MAC sub-PDU) of the PDSCH communication.

In some aspects, the base station 110 may transmit the first PDSCH communication (with the RAR having the second RAR type) and the second PDSCH communication (with the RAR having the first RAR type) concurrently (e.g., using unicast or multicast transmission). For example, the base station 110 may transmit the first PDSCH communication and the second PDSCH communication in the same time resource (e.g., overlapping time resources or identical time resources), the same symbol, the same slot, the same subframe, the same radio frame, the same RACH occasion, and/or the like.

As shown by reference number 545, the UE 120 may use the first transmission parameter to obtain (e.g., obtain, attempt to obtain, monitor for, receive, decode, demodulate, descramble, and/or the like) the PDCCH communication. In example 500, the UE 120 uses the first transmission parameter to obtain the PDCCH communication because the UE 120 transmitted a RAM for the first RAR type, which corresponds to the first transmission parameter according to the RACH configuration information. In this case, the UE 120 obtains (e.g., receives, decodes, demodulates, descrambles, and/or the like) the PDCCH communication because the PDCCH communication is transmitted using the first transmission parameter. Due to successfully obtaining the PDCCH communication, the UE 120 determines that the PDSCH communication, scheduled by the PDCCH communication, includes a RAR having the first RAR type. As shown by reference number 550, the UE 120 may obtain the PDSCH communication due to successfully obtaining the PDCCH communication.

In some aspects, the transmission scheme is a DMRS-based RAR type indication scheme. The DMRS-based RAR type indication scheme may use different sets of (e.g., one or more) DMRS scrambling identifiers and/or different sets of (e.g., one or more) antenna port mapping identifiers to differentiate between RAR types. In this case, the transmission parameter may include a DMRS scrambling identifier for the PDCCH communication (e.g., a scrambling identifier for a DMRS sequence associated with the PDCCH communication) and/or a DMRS antenna port mapping identifier for the PDCCH communication (e.g., an antenna port mapping identifier for a DMRS sequence associated with the PDCCH communication).

For the DMRS-based RAR type indication scheme, the RACH configuration information may indicate a first set of DMRS scrambling identifiers (e.g., $C_{init,X}$) or a first set of DMRS antenna port mapping identifiers (e.g., $P_{init,X}$) for PDCCH communications that schedule RARs having a first RAR type, a second set of DMRS scrambling identifiers (e.g., $C_{init,Y}$) or a second set of DMRS antenna port mapping identifiers (e.g., $P_{init,Y}$) for PDCCH communications that schedule RARs having a second RAR type, and so on. The first set of DMRS scrambling identifiers and the second set of DMRS scrambling identifiers may be mutually exclusive (e.g., the sets may not intersect). Similarly, the first set of DMRS antenna port mapping identifiers and the second set of DMRS antenna port mapping identifiers may be mutually exclusive.

For the DMRS-based RAR type indication scheme, the UE 120 may attempt to obtain the PDCCH communication by using the DMRS scrambling identifier to descramble the DMRS sequence associated with the PDCCH communication. Additionally, or alternatively, the UE 120 may attempt to obtain the PDCCH communication by using the DMRS antenna port mapping identifier to de-map resource elements occupied by the DMRS sequence.

In some aspects, the transmission scheme is a DCI-based RAR type indication scheme. The DCI-based RAR type indication scheme may use different sets of DCI scrambling identifiers to differentiate between RAR types. In this case, the transmission parameter may include a DCI scrambling identifier for the PDCCH communication (e.g., a scrambling identifier for DCI carried in the PDCCH communication). For the DCI-based RAR type indication scheme, the RACH configuration information may indicate a first set of DCI scrambling identifiers (e.g., $D_{init,X}$) for PDCCH communications that schedule RARs having a first RAR type, a second set of DCI scrambling identifiers (e.g., $D_{init,Y}$) for PDCCH communications that schedule RARs having a second RAR type, and so on. The first set of DCI scrambling identifiers and the second set of DCI scrambling identifiers may be mutually exclusive. For the DCI-based RAR type indication scheme, the UE 120 may attempt to obtain the PDCCH communication by using the DCI scrambling identifier to descramble the DCI carried in the PDCCH communication.

In some aspects, the transmission scheme is a cyclic redundancy check (CRC)-based RAR type indication scheme. The CRC-based RAR type indication scheme may use different sets of CRC masks to differentiate between RAR types. In this case, the transmission parameter may include a CRC mask for DCI carried in the PDCCH communication. For the CRC-based RAR type indication scheme, the RACH configuration information may indicate a first set of CRC masks (e.g., $M_X$) for PDCCH communications that schedule RARs having a first RAR type, a second set of CRC masks (e.g., $M_Y$) for PDCCH communications that schedule RARs having a second RAR type, and so on. The first set of CRC masks and the second set of CRC masks may be mutually exclusive. For the CRC-based RAR type indication scheme, the UE 120 may attempt to obtain the PDCCH communication by using the CRC mask to perform a cyclic redundancy check for the DCI carried in the PDCCH communication.

In some aspects, the transmission scheme is an interleaver-based RAR type indication scheme. The interleaver-based RAR type indication scheme may use different sets of interleaving patterns to differentiate between RAR types. In this case, the transmission parameter may include an interleaving pattern associated with DCI carried in the PDCCH communication. The interleaving pattern may be applied to a CRC of the DCI (e.g., to CRC bits but not to DCI payload bits), or may be applied to the CRC and the DCI (e.g., to both CRC and DCI payload bits). For the interleaver-based RAR type indication scheme, the RACH configuration information may indicate a first set of interleaving patterns (e.g., $I_X$) for PDCCH communications that schedule RARs having a first RAR type, a second set of interleaving patterns (e.g., $I_Y$) for PDCCH communications that schedule RARs having a second RAR type, and so on. The first set of interleaving patterns and the second set of interleaving patterns may be mutually exclusive. For the interleaver-based RAR type indication scheme, the UE 120 may attempt to obtain the PDCCH communication by using the interleaving pattern to perform de-interleaving of the CRC of the DCI (e.g., de-interleaving of the CRC bits, but not the DCI payload bits), or to perform de-interleaving of the CRC and the DCI (e.g., de-interleaving of the CRC bits and the DCI payload bits).

In some aspects, the transmission scheme is a control resource set (CORESET)-based RAR type indication scheme. The CORESET-based RAR type indication scheme may use different CORESETs (or CORESET configurations) and/or different search spaces (SSs) (or SS configurations) to differentiate between RAR types. In this case, the transmission parameter may include a CORESET configuration and/or an SS configuration associated with the PDCCH communication. For the CORESET-based RAR type indication scheme, the RACH configuration information may indicate a first CORESET configuration and/or a first SS configuration for PDCCH communications that schedule RARs having a first RAR type, a second CORESET configuration and/or a second SS configuration for PDCCH communications that schedule RARs having a second RAR type, and so on. The first CORESET configuration and/or SS configuration may be different from the second CORESET configuration and/or SS configuration. For the CORESET-based RAR type indication scheme, the UE 120 may attempt to obtain the PDCCH communication by monitoring for the PDCCH communication in the CORESET (e.g., defined or configured according to the CORESET configuration) and/or the SS (e.g., defined or configured according to the SS configuration).

In some aspects, the transmission scheme is a spatial-based RAR type indication scheme. The spatial-based RAR type indication scheme may use different spatial parameters to differentiate between RAR types. In this case, the transmission parameter may include a spatial parameter associated with the PDCCH communication. The spatial parameter may include, for example, a precoder, a quasi co-location (QCL) relationship, a transmission configuration indication (TCI) state, and/or the like, associated with the PDCCH communication. For the spatial-based RAR type indication scheme, the RACH configuration information may indicate a first spatial parameter for PDCCH communications that schedule RARs having a first RAR type, a second spatial parameter for PDCCH communications that schedule RARs having a second RAR type, and so on. The first spatial parameter may be different from the second spatial parameter. For the spatial-based RAR type indication scheme, the UE 120 may attempt to obtain the PDCCH communication by monitoring for the PDCCH communication using the spatial parameter (e.g., using a precoder, a QCL relationship, a TCI state, and/or the like).

In some aspects, the transmission scheme is a RNTI-based RAR type indication scheme. The RNTI-based RAR type indication scheme may use different RNTIs to differentiate between RAR types. In this case, the transmission parameter may include a RNTI associated with the PDCCH communication, such as a random access RNTI (RA-RNTI). For the RNTI-based RAR type indication scheme, the RACH configuration information may indicate a first RNTI for PDCCH communications that schedule RARs having a first RAR type, a second RNTI for PDCCH communications that schedule RARs having a second RAR type, and so on. The first RNTI may be different from the second RNTI. For the RNTI-based RAR type indication scheme, the UE 120 may attempt to obtain the PDCCH communication by descrambling the PDCCH communication using the RNTI.

In some aspects, the base station 110 may apply multiple transmission schemes and/or transmission parameters to enable the UE 120 to use a PDCCH communication to differentiate between different RAR types. For example, the base station 110 may apply one or more of the DMRS-based RAR type indication scheme, the DCI-based RAR type indication scheme, the CRC-based RAR type indication scheme, the interleaver-based RAR type indication scheme, the CORESET-based RAR type indication scheme, the spatial-based RAR type indication scheme, and/or the RNTI-based RAR type indication scheme. In some aspects, the set of transmission schemes used to enable RAR type differentiation is indicated in the RACH configuration information. Additionally, or alternatively, the RACH configuration information may indicate multiple transmission parameters (e.g., of different transmission schemes) associated with a particular RAR type. The UE 120 may use these multiple transmission schemes and/or transmission parameters to attempt to obtain the PDCCH communication and to determine whether a RAR type, of a PDSCH communication scheduled by the PDCCH communication, is the same as a RAR type associated with a random access message transmitted by the UE 120.

By enabling the UE 120 to differentiate between different RAR types without fully decoding all PDCCHs and/or all PDSCHs in a RACH occasion, some techniques and apparatuses described herein conserve resources of the UE 120, reduce latency, and/or the like.

As indicated above, FIG. 5 is provided as an example. Other examples may differ from what is described with respect to FIG. 5.

Figure 6:
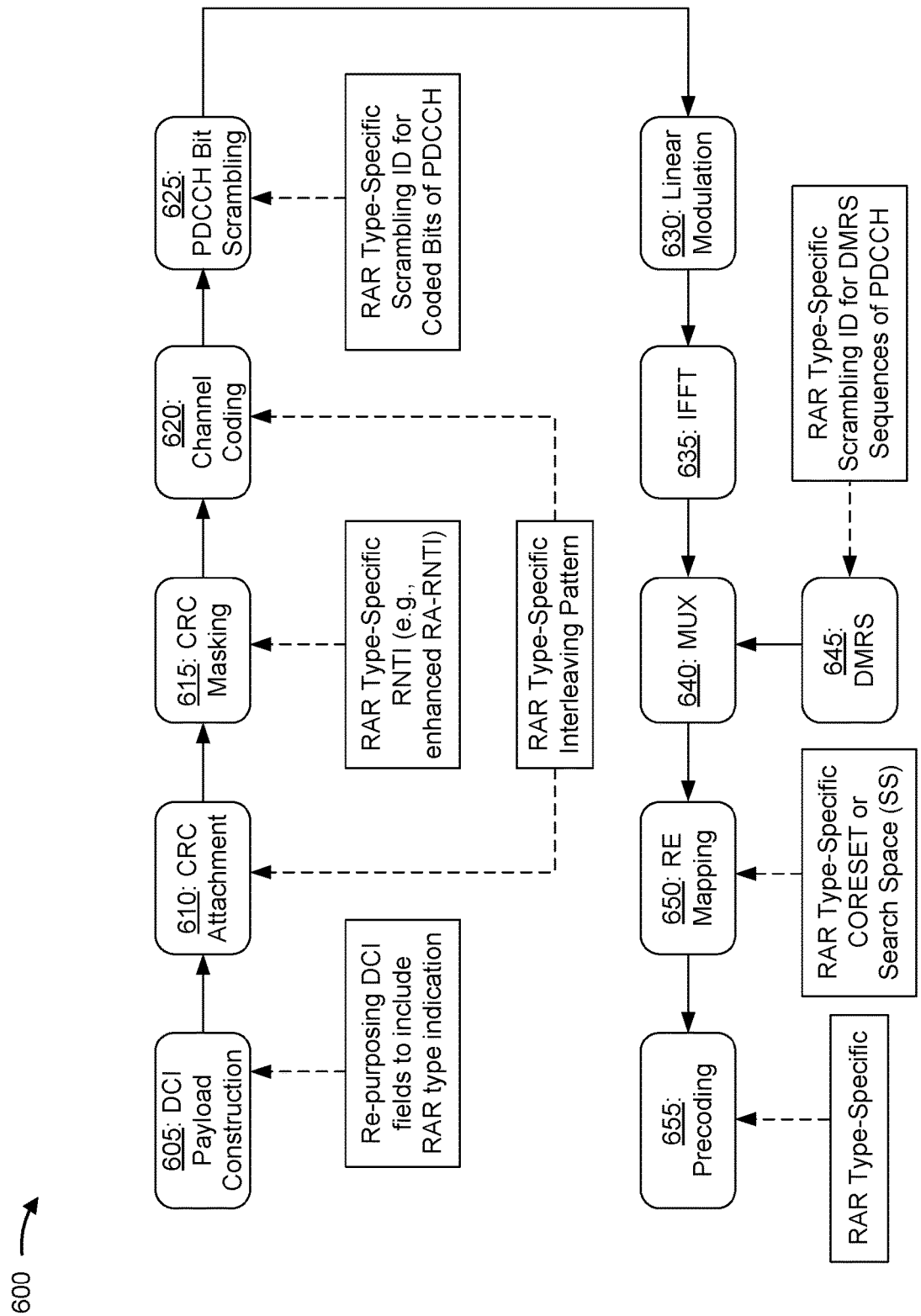

FIG. 6 is a diagram illustrating an example 600 of random access response type differentiation, in accordance with various aspects of the present disclosure. FIG. 6 shows a process for DMRS and/or PDCCH transmission by a base station 110, and a manner in which the base station 110 can apply different transmission schemes (described above in connection with FIG. 5) to enable the UE 120 to differentiate between different RAR types.

As shown, the base station 110 may construct a DCI payload at block 605. In some aspects, the base station 110 may include information in the DCI to indicate the RAR type (and/or an LSB of an SFN, as described in more detail below in connection with FIG. 7). The base station 110 may then perform CRC attachment at block 610. In some aspects, the base station 110 may apply an interleaving pattern to CRC bits to indicate the RAR type. The base station 110 may then perform CRC masking at block 615. In some aspects, the base station 110 may apply a CRC mask that indicates the RAR type. Additionally, or alternatively, the base station 110 may scramble CRC bits using a RNTI that indicates the RAR type.

The base station 110 may then perform channel coding at block 620. In some aspects, the base station 110 may apply an interleaving pattern to coded bits (e.g., DCI bits plus CRC bits) to indicate the RAR type. The base station 110 may then perform PDCCH bit scrambling at block 625. In some aspects, the base station 110 may scramble PDCCH bits (e.g., coded bits) using a DCI scrambling identifier to indicate the RAR type. The base station 110 may then perform linear modulation at block 630, may apply an inverse fast Fourier transform (IFFT) at block 635, and may perform multiplexing (MUX) at block 640 with DMRS generated at block 645. In some aspects, the base station 110 may apply a DMRS scrambling identifier to a DMRS sequence of the DMRS to indicate the RAR type.

The base station 110 may then perform resource element (RE) mapping at block 650. In some aspects, the base station 110 may map REs to a CORESET and/or an SS to indicate the RAR type. The base station 110 may then perform precoding at block 655. In some aspects, the base station 110 may apply a precoder and/or another spatial parameter to indicate the RAR type. The base station 110 may then transmit the PDCCH (and accompanying DMRS).

By enabling the UE 120 to differentiate between different RAR types without fully decoding all PDCCHs and/or all PDSCHs in a RACH occasion, some techniques and apparatuses described herein conserve resources of the UE 120, reduce latency, and/or the like.

As indicated above, FIG. 6 is provided as an example. Other examples may differ from what is described with respect to FIG. 6.

Figure 7:
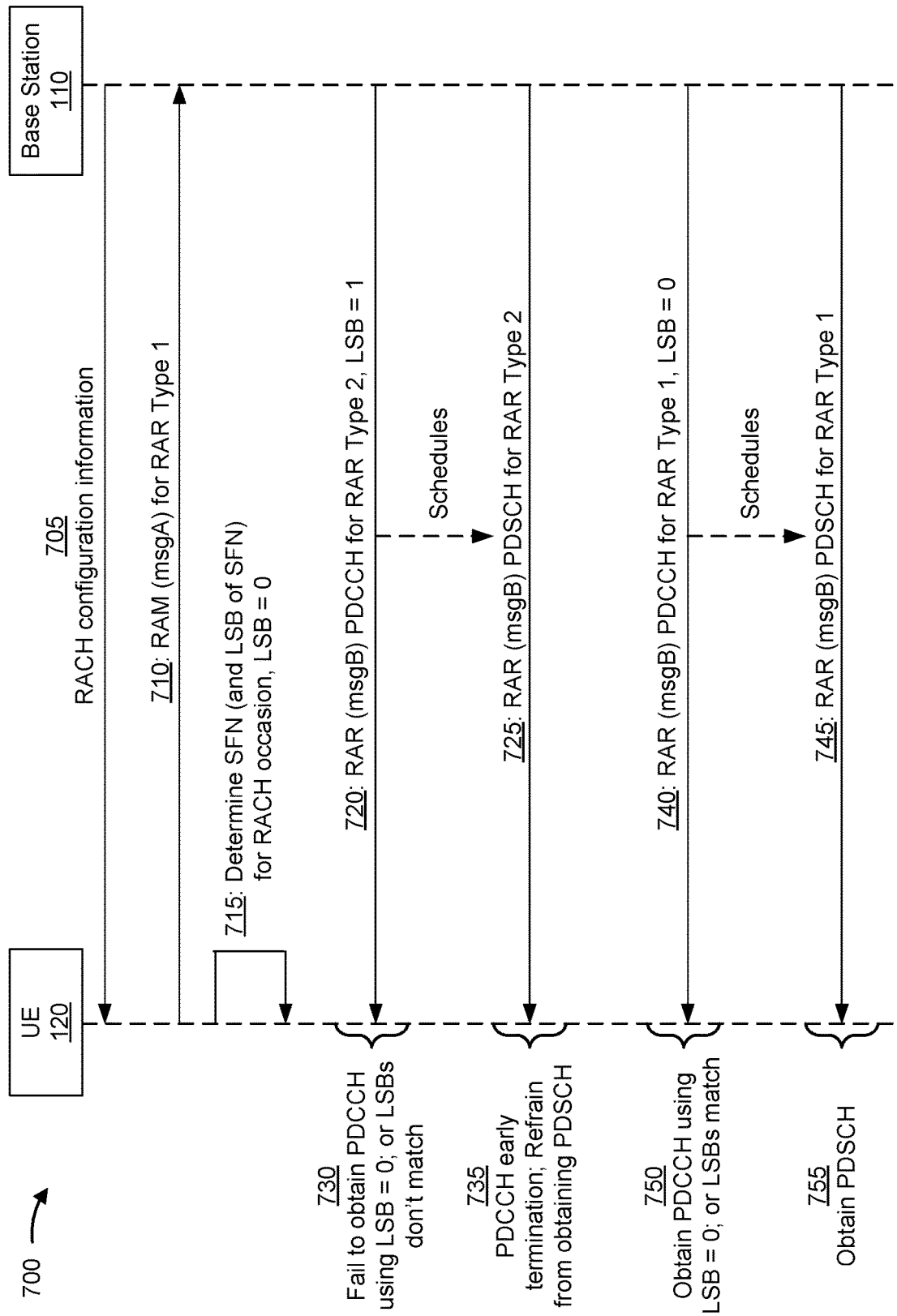

FIG. 7 is a diagram illustrating an example 700 of random access response type differentiation, in accordance with various aspects of the present disclosure. As shown in FIG. 7, a UE 120 and a base station 110 may communicate with one another to perform a RACH procedure.

As shown by reference number 705, the base station 110 may transmit RACH configuration information to the UE 120, in a similar manner as described elsewhere herein. As shown by reference number 710, the UE 120 may transmit a RAM to the base station 110. The RAM may include, for example, a RAM preamble and/or a RAM payload, as described above in connection with FIGS. 3 and 4. In a two-step RACH procedure, the RAM may be msgA. In a four-step RACH procedure, the RAM may be msg1. As shown, the RAM may be associated with a first RAR type, shown as RAR Type 1. In some aspects, the UE 120 may determine the RAR type based at least in part on an event that triggers the RACH procedure, a priority of the RACH procedure, a UE capability, a random access mode of the RACH procedure (e.g., two-step RACH or four-step RACH), and/or the like. In some aspects, the RAR type is message B of a two-step RACH procedure (e.g., with an extended RAR window or a reduced RAR window).

As shown by reference number 715, the UE 120 may determine an SFN of a RACH occasion to be monitored by the UE. In some aspects, the UE 120 may determine the SFN based at least in part on the RACH configuration information, a resource or set of resources in which the UE 120 transmits the RAM, and/or the like. As further shown, the UE 120 may determine an LSB of the SFN, sometimes referred to as a first LSB. In example 700, the LSB of the SFN determined by the UE 120 (the first LSB) is zero (0).

As shown by reference number 720, the base station 110 may transmit a PDCCH communication (e.g., a first PDCCH communication) associated with a second RAR type. For example, the PDCCH communication may schedule a PDSCH communication (e.g., a first PDSCH communication) that includes a RAR (e.g., msgB, msg2, and/or the like) having the second RAR type. As shown, the base station 110 may transmit the PDCCH communication in an SFN having an LSB that is different from the LSB of the SFN determined by the UE 120. In example 700, the LSB of the SFN in which the PDCCH communication is transmitted is one (1). The LSB of the SFN in which the PDCCH communication is transmitted may be referred to as a second LSB.

As shown by reference number 725, the base station 110 may transmit the PDSCH communication, including the RAR having the second RAR type, according to scheduling information indicated in the PDCCH communication. The PDSCH communication may include the RAR in a MAC PDU (or a MAC sub-PDU) of the PDSCH communication.

As shown by reference number 730, the UE 120 may use the first LSB to identify a RAR type of a RAR scheduled by the PDCCH communication. For example, the UE 120 may use the first LSB to determine whether the RAR type of the RAR scheduled by the PDCCH communication is the same as the RAR type associated with the RAM transmitted by the UE 120 (in example 700, RAR type 1).

In some aspects, the UE 120 may generate a RNTI (e.g., an RA-RNTI) based at least in part on the first LSB. The UE 120 may use the generated RNTI to descramble the PDCCH communication. In some aspects, the UE 120 may generate the RNTI (e.g., an enhanced RA-RNTI or eRA-RNTI) using one of the following equations (1) or (2):

$$eRA\text{-}RNTI \triangleq 17920 + ul\_carrier\_id + s\_id + 14 \times t\_id + 14 \times 80 \times (f\_id + 8*LSB\_SFN), \text{ for } LSB\_SFN \text{ in the range of } \{0,1,2,3,4\} \quad (1)$$

$$eRA\text{-}RNTI \triangleq 17920 + mod(LSB\_SFN, 2) + s\_id + 14 \times t\_id + 14 \times 80 \times (f\_id + 8*floor(LSB\_SFN/2)), \text{ for } LSB\_SFN \text{ in the range of } \{0,1,2,3,4,5,6,7,8\} \quad (2)$$

In the above equations, s_id is the index of the first OFDM symbol of the specified PRACH (0≤s_id<14), t_id is the index of the first slot of the specified PRACH in a system frame (0≤t_id<80), f_id is the index of the specified PRACH in the frequency domain (0≤f_id<8), ul_carrier_id is the UL carrier used for PRACH preamble transmission (0 for NUL carrier, and 1 for SUL carrier), and LSB_SFN is the LSB of the SFN in which the RACH occasion occurs.

Additionally, or alternatively, the UE 120 may compare the first LSB and the second LSB, which may be indicated by the base station 110. For example, the second LSB may be indicated in DCI carried by the PDCCH (e.g., in more or more DCI fields, in an unused field, using one or more reserved bits). In some aspects, the PDCCH is a group common PDCCH (GC-PDCCH) having DCI format 1_0.

Additionally, or alternatively, the UE 120 may compare the first LSB to a value indicated by a DMRS scrambling identifier associated with the PDCCH communication, a DCI scrambling identifier associated with the PDCCH communication, an interleaving pattern associated with the PDCCH communication, and/or the like. In some aspects, the RACH configuration information may indicate an LSB value that corresponds to a DMRS scrambling identifier (or a set of DMRS scrambling identifiers), the DCI scrambling identifier (or a set of DMRS scrambling identifiers), and/or the interleaving pattern (or a set of interleaving patterns). The UE 120 may compare the first LSB and the LSB value.

As shown by reference number 735, the UE 120 may refrain from obtaining the PDSCH communication and/or may perform early termination of PDCCH reception based at least in part on the RAR type of the PDCCH communication. For example, the UE 120 may refrain from obtaining the PDSCH communication and/or may perform early termination of PDCCH reception based at least in part on whether the RAR type of the RAR scheduled by the PDCCH communication is the same as the RAR type associated with the RAM transmitted by the UE 120. For example, if the UE 120 fails to successfully descramble the PDCCH communication using a RNTI generated based at least in part on the first LSB, then the UE 120 may refrain from obtaining the PDSCH communication and/or may perform early termination of PDCCH reception. Additionally, or alternatively, if the first LSB does not match a second LSB indicated in DCI of the PDCCH communication, then the UE 120 may refrain from obtaining the PDSCH communication and/or may perform early termination of PDCCH reception. Additionally, or alternatively, if the first LSB does not match an LSB value indicated by a DMRS scrambling identifier associated with the PDCCH communication, a DCI scrambling identifier associated with the PDCCH communication, an interleaving pattern associated with the PDCCH communication, and/or the like, then the UE 120 may refrain from obtaining the PDSCH communication and/or may perform early termination of PDCCH reception.

As shown by reference number 740, the base station 110 may transmit a PDCCH communication (e.g., a second PDCCH communication) associated with the first RAR type. For example, the PDCCH communication may schedule a PDSCH communication (e.g., a second PDSCH communication) that includes a RAR (e.g., msgB, msg2, and/or the like) having the first RAR type. As shown, the base station 110 may transmit the PDCCH communication in an SFN having an LSB (a second LSB, having a value of one) that is the same as the LSB of the SFN determined by the UE 120 (a first LSB, having a value of one).

As shown by reference number 745, the base station 110 may transmit the PDSCH communication, including the RAR having the first RAR type, according to scheduling information indicated in the PDCCH communication. The PDSCH communication may include the RAR in a MAC PDU (or a MAC sub-PDU) of the PDSCH communication.

As shown by reference number 750, the UE 120 may use the first LSB to identify a RAR type of a RAR scheduled by the PDCCH communication, in a similar manner as described above. For example, the UE 120 may use the first LSB to determine whether the RAR type of the RAR scheduled by the PDCCH communication is the same as the RAR type associated with the RAM transmitted by the UE 120 (in example 700, RAR type 1).

As shown by reference number 755, the UE 120 may obtain the PDCCH communication and/or may obtain the PDSCH communication based at least in part on the RAR type of the PDCCH communication. For example, the UE 120 may obtain the PDCCH communication and/or the PDSCH communication based at least in part on whether the RAR type of the RAR scheduled by the PDCCH communication is the same as the RAR type associated with the RAM transmitted by the UE 120. For example, if the UE 120 successfully descrambles the PDCCH communication using a RNTI generated based at least in part on the first LSB, then the UE 120 may obtain the PDCCH communication and/or the PDSCH communication. Additionally, or alternatively, if the first LSB matches a second LSB indicated in DCI of the PDCCH communication, then the UE 120 may obtain the PDCCH communication and/or the PDSCH communication. Additionally, or alternatively, if the first LSB matches an LSB value indicated by a DMRS scrambling identifier associated with the PDCCH communication, a DCI scrambling identifier associated with the PDCCH communication, an interleaving pattern associated with the PDCCH communication, and/or the like, then the UE 120 may obtain the PDCCH communication and/or the PDSCH communication.

By enabling the UE 120 to differentiate between different RAR types without fully decoding all PDCCHs and/or all PDSCHs in a RACH occasion, some techniques and apparatuses described herein conserve resources of the UE 120, reduce latency, prevent RACH collisions, and/or the like.

As indicated above, FIG. 7 is provided as an example. Other examples may differ from what is described with respect to FIG. 7.

Figure 8:
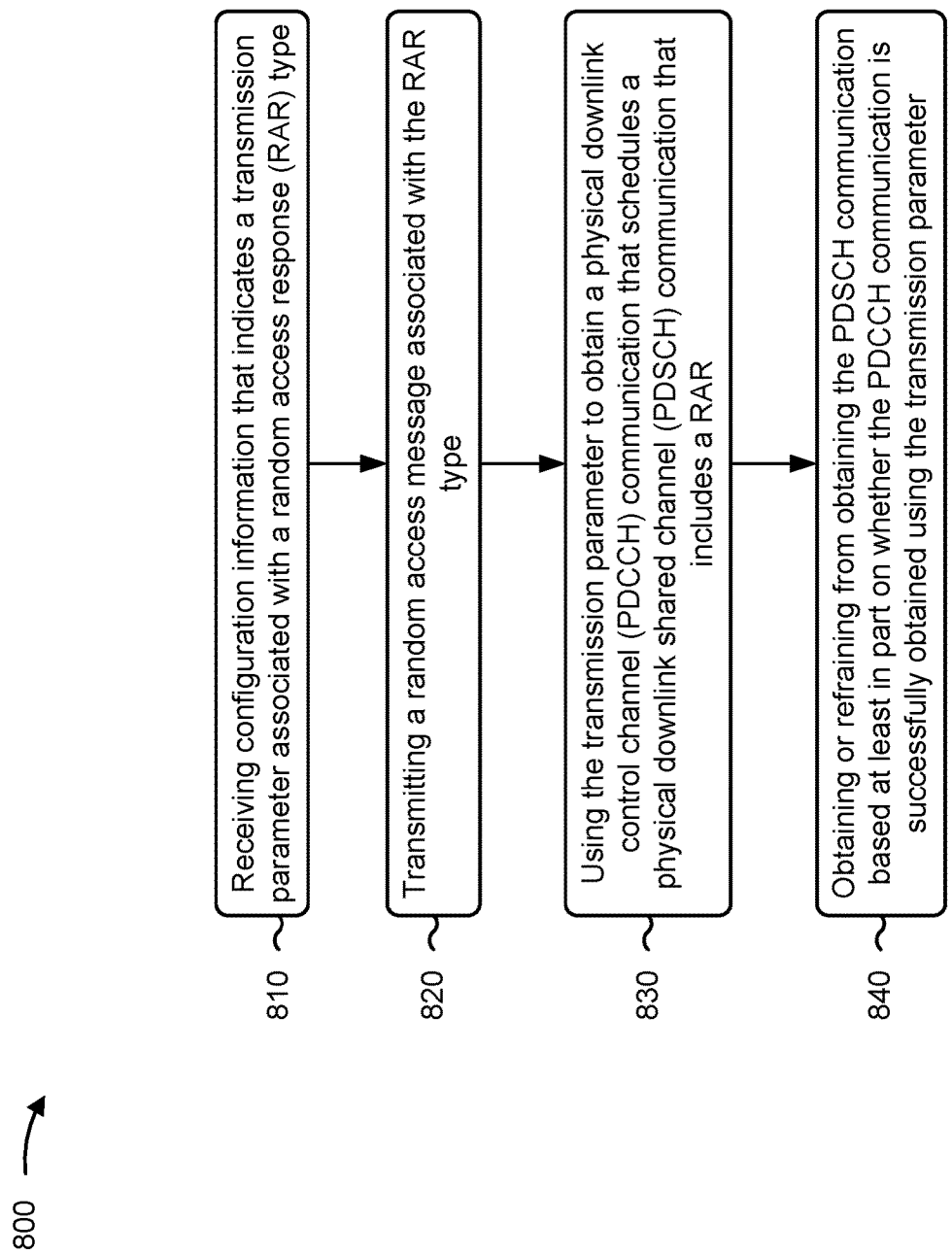
FIGS. 8-11 are diagrams illustrating example processes relating to random access response type differentiation, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with random access response type differentiation.

As shown in FIG. 8, in some aspects, process 800 may include receiving configuration information that indicates a transmission parameter associated with a RAR type (block 810). For example, the UE (e.g., using receive processor 258, transmit processor 264, controller/processor 280, memory 282, and/or the like) may receive configuration information that indicates a transmission parameter associated with a RAR type, as described above.

As further shown in FIG. 8, in some aspects, process 800 may include transmitting a random access message associated with the RAR type (block 820). For example, the UE (e.g., using receive processor 258, transmit processor 264, controller/processor 280, memory 282, and/or the like) may transmit a random access message associated with the RAR type, as described above.

As further shown in FIG. 8, in some aspects, process 800 may include using the transmission parameter to obtain a PDCCH communication that schedules a PDSCH communication that includes a RAR (block 830). For example, the UE (e.g., using receive processor 258, transmit processor 264, controller/processor 280, memory 282, and/or the like) may use the transmission parameter to obtain a PDCCH communication that schedules a PDSCH communication that includes a RAR, as described above.

As further shown in FIG. 8, in some aspects, process 800 may include obtaining or refraining from obtaining the PDSCH communication based at least in part on whether the PDCCH communication is successfully obtained using the transmission parameter (block 840). For example, the UE (e.g., using receive processor 258, transmit processor 264, controller/processor 280, memory 282, and/or the like) may obtain or refrain from obtaining the PDSCH communication based at least in part on whether the PDCCH communication is successfully obtained using the transmission parameter, as described above.

Process 800 may include additional aspects, such as any single aspect or any combination of aspects described below and/or in connection with one or more other processes described elsewhere herein.

In a first aspect, obtaining or refraining from obtaining the PDSCH communication comprises obtaining the PDSCH communication if the PDCCH communication is successfully received using the transmission parameter, or refraining from obtaining the PDSCH communication if the PDCCH communication is not successfully received using the transmission parameter.

In a second aspect, alone or in combination with the first aspect, different RAR types are associated with at least one of different random access modes, different UE capabilities, different priorities, different lengths of a RAR window, or a combination thereof.

In a third aspect, alone or in combination with one or more of the first and second aspects, the transmission parameter includes a scrambling identifier or a distinctive antenna port mapping identifier for a demodulation reference signal (DMRS) sequence associated with the PDCCH communication.

In a fourth aspect, alone or in combination with one or more of the first through third aspects, using the transmission parameter to obtain the PDCCH communication comprises using the scrambling identifier to descramble the DMRS sequence associated with the PDCCH communication or using the antenna port mapping identifier to de-map resource elements occupied by the DMRS sequence.

In a fifth aspect, alone or in combination with one or more of the first through fourth aspects, the configuration information indicates a first set of DMRS scrambling identifiers or a first set of DMRS antenna port mapping identifiers for PDCCH communications that schedule RARs having a first RAR type, and a second set of DMRS scrambling identifiers or a second set of DMRS antenna port mapping identifiers for PDCCH communications that schedule RARs having a second RAR type.

In a sixth aspect, alone or in combination with one or more of the first through fifth aspects, the first set of DMRS scrambling identifiers and the second set of DMRS scrambling identifiers are mutually exclusive, or the first set of DMRS antenna port mapping identifiers and the second set of DMRS antenna port mapping identifiers are mutually exclusive.

In a seventh aspect, alone or in combination with one or more of the first through sixth aspects, the transmission parameter includes a scrambling identifier for downlink control information (DCI) carried in the PDCCH communication.

In an eighth aspect, alone or in combination with one or more of the first through seventh aspects, using the transmission parameter to obtain the PDCCH communication comprises using the scrambling identifier to descramble the DCI carried in the PDCCH communication.

In a ninth aspect, alone or in combination with one or more of the first through eighth aspects, the configuration information indicates a first set of DCI scrambling identifiers for PDCCH communications that schedule RARs having a first RAR type, and a second set of DCI scrambling identifiers for PDCCH communications that schedule RARs having a second RAR type.

In a tenth aspect, alone or in combination with one or more of the first through ninth aspects, the first set of DCI scrambling identifiers and the second set of DCI scrambling identifiers are mutually exclusive.

In an eleventh aspect, alone or in combination with one or more of the first through tenth aspects, the transmission parameter includes a cyclic redundancy check (CRC) mask for DCI carried in the PDCCH communication.

In a twelfth aspect, alone or in combination with one or more of the first through eleventh aspects, using the transmission parameter to obtain the PDCCH communication comprises using the CRC mask to perform a CRC for the DCI carried in the PDCCH communication.

In a thirteenth aspect, alone or in combination with one or more of the first through twelfth aspects, the configuration information indicates a first set of CRC masks for DCI carried in PDCCH communications that schedule RARs having a first RAR type, and a second set of CRC masks for DCI carried in PDCCH communications that schedule RARs having a second RAR type.

In a fourteenth aspect, alone or in combination with one or more of the first through thirteenth aspects, the first set of CRC masks and the second set of CRC masks are mutually exclusive.

In a fifteenth aspect, alone or in combination with one or more of the first through fourteenth aspects, the transmission parameter includes an interleaving pattern associated with DCI carried in the PDCCH communication.

In a sixteenth aspect, alone or in combination with one or more of the first through fifteenth aspects, the interleaving pattern is applied to a CRC of the DCI or is applied to the CRC and the DCI.

In a seventeenth aspect, alone or in combination with one or more of the first through sixteenth aspects, using the transmission parameter to obtain the PDCCH communication comprises using the interleaving pattern to perform de-interleaving of the CRC of the DCI or the CRC and the DCI.

In an eighteenth aspect, alone or in combination with one or more of the first through seventeenth aspects, the configuration information indicates a first set of interleaving patterns for DCI carried in PDCCH communications that schedule RARs having a first RAR type, and a second set of interleaving patterns for DCI carried in PDCCH communications that schedule RARs having a second RAR type.

In a nineteenth aspect, alone or in combination with one or more of the first through eighteenth aspects, the first set of interleaving patterns and the second set of interleaving patterns are mutually exclusive.

In a twentieth aspect, alone or in combination with one or more of the first through nineteenth aspects, the transmission parameter includes a control resource set (CORESET) configuration associated with the PDCCH communication, a search space (SS) configuration associated with the PDCCH communication, or a combination thereof.

In a twenty-first aspect, alone or in combination with one or more of the first through twentieth aspects, using the transmission parameter to obtain the PDCCH communication comprises monitoring at least one of a CORESET configured according to the CORESET configuration or an SS configured according to the SS configuration for the PDCCH communication associated with the RAR type.

In a twenty-second aspect, alone or in combination with one or more of the first through twenty-first aspects, the configuration information indicates a first CORESET configuration or a first search space configuration for PDCCH communications that schedule RARs having a first RAR type, and a second CORESET configuration or a second search space configuration for PDCCH communications that schedule RARs having a second RAR type.

In a twenty-third aspect, alone or in combination with one or more of the first through twenty-second aspects, the transmission parameter includes a spatial parameter associated with the PDCCH communication.

In a twenty-fourth aspect, alone or in combination with one or more of the first through twenty-third aspects, the spatial parameter includes at least one of a precoder, a quasi co-location (QCL) relationship, a transmission configuration indication (TCI) state, or a combination thereof.

In a twenty-fifth aspect, alone or in combination with one or more of the first through twenty-fourth aspects, using the transmission parameter to obtain the PDCCH communication comprises monitoring for the PDCCH communication using the spatial parameter.

In a twenty-sixth aspect, alone or in combination with one or more of the first through twenty-fifth aspects, the configuration information indicates a first spatial parameter for PDCCH communications that schedule RARs having a first RAR type, and a second spatial parameter for PDCCH communications that schedule RARs having a second RAR type.

In a twenty-seventh aspect, alone or in combination with one or more of the first through twenty-sixth aspects, the transmission parameter is associated with a transmission scheme for differentiating between different RAR types.

In a twenty-eighth aspect, alone or in combination with one or more of the first through twenty-seventh aspects, the RAR is one of multiple RARs, having different RAR types, that are transmitted concurrently, using different RAR type differentiation schemes, based on the random access message.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
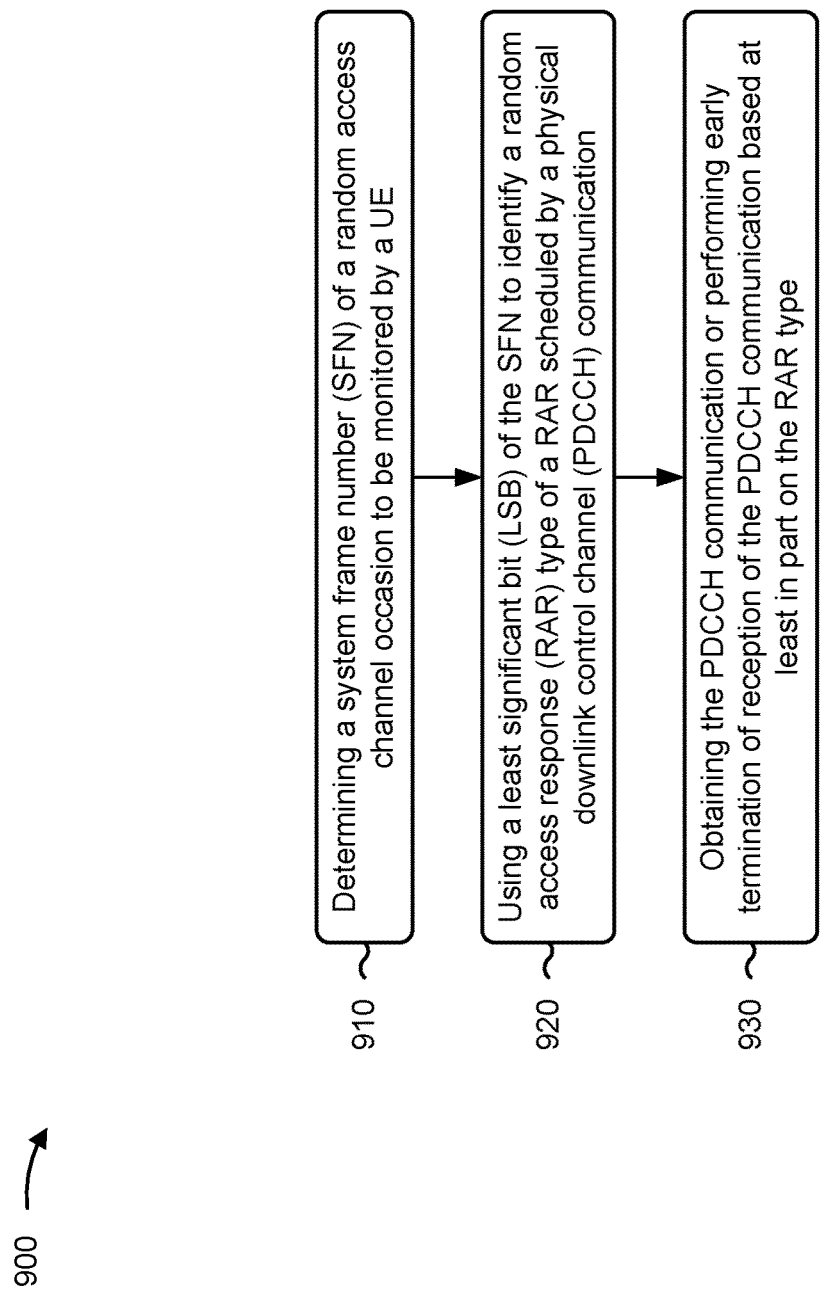

FIG. 9 is a diagram illustrating an example process 900 performed, for example, by a UE, in accordance with various aspects of the present disclosure. Example process 900 is an example where the UE (e.g., UE 120 and/or the like) performs operations associated with random access response type differentiation.

As shown in FIG. 9, in some aspects, process 900 may include determining an SFN of a random access channel occasion to be monitored by the UE (block 910). For example, the UE (e.g., using receive processor 258, transmit processor 264, controller/processor 280, memory 282, and/or the like) may determine an SFN of a random access channel occasion to be monitored by the UE, as described above.

As further shown in FIG. 9, in some aspects, process 900 may include using an LSB of the SFN to identify a RAR type of a RAR scheduled by a PDCCH communication (block 920). For example, the UE (e.g., using receive processor 258, transmit processor 264, controller/processor 280, memory 282, and/or the like) may use an LSB of the SFN to identify a RAR type of a RAR scheduled by a PDCCH communication, as described above.

As further shown in FIG. 9, in some aspects, process 900 may include obtaining the PDCCH communication or performing early termination of reception of the PDCCH communication based at least in part on the RAR type (block 930). For example, the UE (e.g., using receive processor 258, transmit processor 264, controller/processor 280, memory 282, and/or the like) may obtain the PDCCH communication or perform early termination of reception of the PDCCH communication based at least in part on the RAR type, as described above.

Process 900 may include additional aspects, such as any single aspect or any combination of aspects described below and/or in connection with one or more other processes described elsewhere herein.

In a first aspect, the RAR type is message B of a 2-step RACH procedure.

In a second aspect, alone or in combination with the first aspect, using the LSB of the SFN to identify the RAR type comprises: descrambling the PDCCH communication using a random access radio network temporary identifier generated based at least in part on the LSB of the SFN; and identifying the RAR type based at least in part on whether the descrambling is successful.

In a third aspect, alone or in combination with one or more of the first and second aspects, using the LSB of the SFN to identify the RAR type comprises: comparing the LSB of the SFN to a field included in DCI of the PDCCH communication; and identifying the RAR type based at least in part on the comparison.

In a fourth aspect, alone or in combination with one or more of the first through third aspects, using the LSB of the SFN to identify the RAR type comprises: comparing the LSB of the SFN to a value indicated by at least one of a DMRS scrambling identifier used for the PDCCH communication, a DCI scrambling identifier used for the PDCCH communication, or an interleaving pattern used for the PDCCH communication; and identifying the RAR type based at least in part on the comparison.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
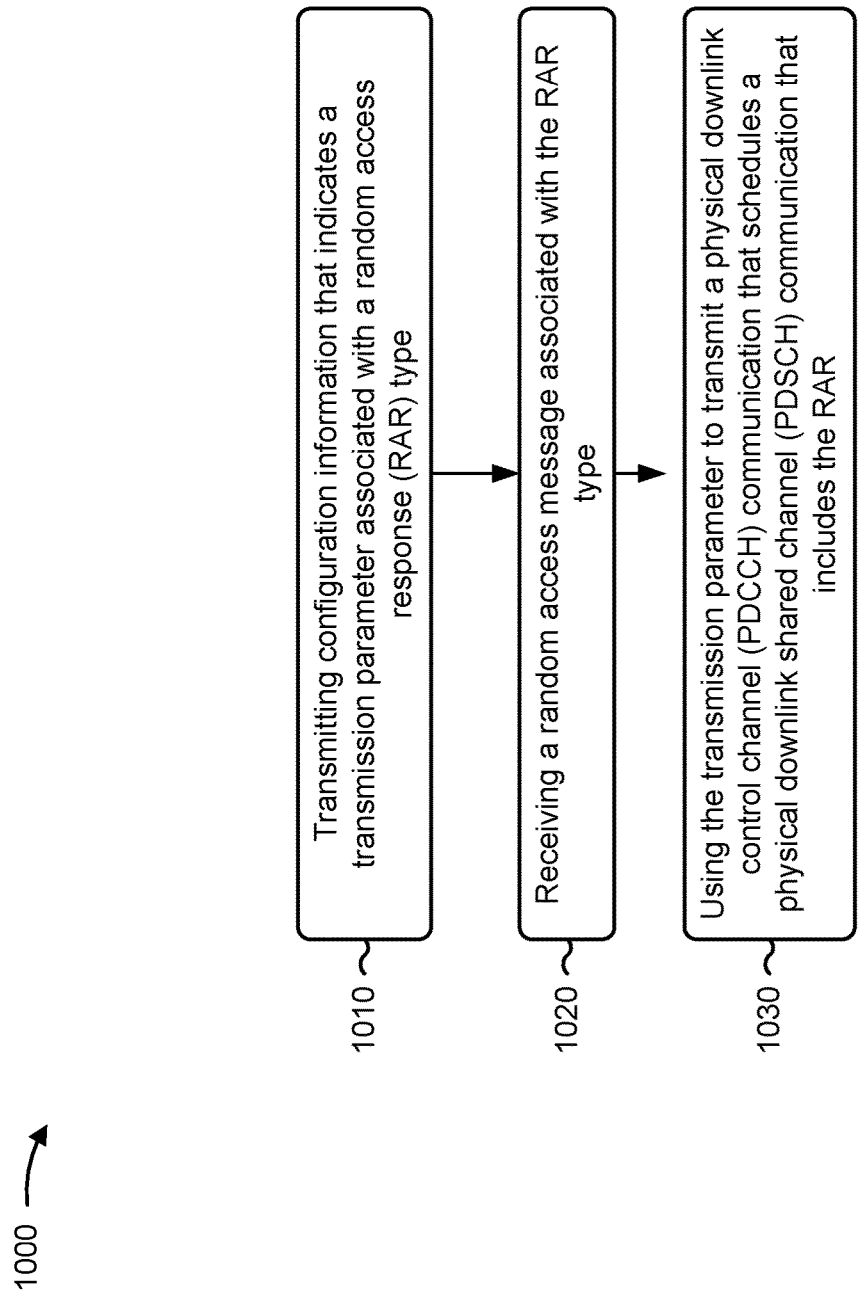

FIG. 10 is a diagram illustrating an example process 1000 performed, for example, by a base station, in accordance with various aspects of the present disclosure. Example process 1000 is an example where the base station (e.g., base station 110 and/or the like) performs operations associated with random access response type differentiation.

As shown in FIG. 10, in some aspects, process 1000 may include transmitting configuration information that indicates a transmission parameter associated with a RAR type (block 1010). For example, the base station (e.g., using transmit processor 220, receive processor 238, controller/processor 240, memory 242, and/or the like) may transmit configuration information that indicates a transmission parameter associated with a RAR type, as described above.

As further shown in FIG. 10, in some aspects, process 1000 may include receiving a random access message associated with the RAR type (block 1020). For example, the base station (e.g., using transmit processor 220, receive processor 238, controller/processor 240, memory 242, and/or the like) may receive a random access message associated with the RAR type, as described above.

As further shown in FIG. 10, in some aspects, process 1000 may include using the transmission parameter to transmit a PDCCH communication that schedules a PDSCH communication that includes the RAR (block 1030). For example, the base station (e.g., using transmit processor 220, receive processor 238, controller/processor 240, memory 242, and/or the like) may use the transmission parameter to transmit a PDCCH communication that schedules a PDSCH communication that includes the RAR, as described above.

Process 1000 may include additional aspects, such as any single aspect or any combination of aspects described below and/or in connection with one or more other processes described elsewhere herein.

In a first aspect, different RAR types are associated with at least one of different random access modes, different UE capabilities, different priorities, different lengths of a RAR window, or a combination thereof.

In a second aspect, alone or in combination with the first aspect, the transmission parameter includes a scrambling identifier or a distinctive antenna port mapping identifier for a DMRS sequence associated with the PDCCH communication.

In a third aspect, alone or in combination with one or more of the first and second aspects, using the transmission parameter to transmit the PDCCH communication comprises using the scrambling identifier to scramble the DMRS sequence associated with the PDCCH communication or using the antenna port mapping identifier to map resource elements occupied by the DMRS sequence.

In a fourth aspect, alone or in combination with one or more of the first through third aspects, the configuration information indicates a first set of DMRS scrambling identifiers or a first set of DMRS antenna port mapping identifiers for PDCCH communications that schedule RARs having a first RAR type, and a second set of DMRS scrambling identifiers or a second set of DMRS antenna port mapping identifiers for PDCCH communications that schedule RARs having a second RAR type.

In a fifth aspect, alone or in combination with one or more of the first through fourth aspects, the first set of DMRS scrambling identifiers and the second set of DMRS scrambling identifiers are mutually exclusive, or the first set of DMRS antenna port mapping identifiers and the second set of DMRS antenna port mapping identifiers are mutually exclusive.

In a sixth aspect, alone or in combination with one or more of the first through fifth aspects, the transmission parameter includes a scrambling identifier for DCI carried in the PDCCH communication.

In a seventh aspect, alone or in combination with one or more of the first through sixth aspects, using the transmission parameter to transmit the PDCCH communication comprises using the scrambling identifier to scramble the DCI carried in the PDCCH communication.

In an eighth aspect, alone or in combination with one or more of the first through seventh aspects, the configuration information indicates a first set of DCI scrambling identifiers for PDCCH communications that schedule RARs having a first RAR type, and a second set of DCI scrambling identifiers for PDCCH communications that schedule RARs having a second RAR type.

In a ninth aspect, alone or in combination with one or more of the first through eighth aspects, the first set of DCI scrambling identifiers and the second set of DCI scrambling identifiers are mutually exclusive.

In a tenth aspect, alone or in combination with one or more of the first through ninth aspects, the transmission parameter includes a CRC mask for DCI carried in the PDCCH communication.

In an eleventh aspect, alone or in combination with one or more of the first through tenth aspects, using the transmission parameter to transmit the PDCCH communication comprises using the CRC mask to perform CRC masking of a CRC for the DCI carried in the PDCCH communication.

In a twelfth aspect, alone or in combination with one or more of the first through eleventh aspects, the configuration information indicates a first set of CRC masks for DCI carried in PDCCH communications that schedule RARs having a first RAR type, and a second set of CRC masks for DCI carried in PDCCH communications that schedule RARs having a second RAR type.

In a thirteenth aspect, alone or in combination with one or more of the first through twelfth aspects, the first set of CRC masks and the second set of CRC masks are mutually exclusive.

In a fourteenth aspect, alone or in combination with one or more of the first through thirteenth aspects, the transmission parameter includes an interleaving pattern associated with DCI carried in the PDCCH communication.

In a fifteenth aspect, alone or in combination with one or more of the first through fourteenth aspects, the interleaving pattern is applied to a CRC of the DCI or is applied to the CRC and the DCI.

In a sixteenth aspect, alone or in combination with one or more of the first through fifteenth aspects, using the transmission parameter to transmit the PDCCH communication comprises using the interleaving pattern to perform interleaving of the CRC of the DCI or the CRC and the DCI.

In a seventeenth aspect, alone or in combination with one or more of the first through sixteenth aspects, the configuration information indicates a first set of interleaving patterns for DCI carried in PDCCH communications that schedule RARs having a first RAR type, and a second set of interleaving patterns for DCI carried in PDCCH communications that schedule RARs having a second RAR type.

In an eighteenth aspect, alone or in combination with one or more of the first through seventeenth aspects, the first set of interleaving patterns and the second set of interleaving patterns are mutually exclusive.

In a nineteenth aspect, alone or in combination with one or more of the first through eighteenth aspects, the transmission parameter includes a control resource set (CORESET) configuration associated with the PDCCH communication, a search space (SS) configuration associated with the PDCCH communication, or a combination thereof.

In a twentieth aspect, alone or in combination with one or more of the first through nineteenth aspects, using the transmission parameter to transmit the PDCCH communication comprises transmitting the PDCCH communication associated with the RAR type in at least one of a CORESET configured according to the CORESET configuration or an SS configured according to the SS configuration.

In a twenty-first aspect, alone or in combination with one or more of the first through twentieth aspects, the configuration information indicates a first CORESET configuration or a first search space configuration for PDCCH communications that schedule RARs having a first RAR type, and a second CORESET configuration or a second search space configuration for PDCCH communications that schedule RARs having a second RAR type.

In a twenty-second aspect, alone or in combination with one or more of the first through twenty-first aspects, the transmission parameter includes a spatial parameter associated with the PDCCH communication.

In a twenty-third aspect, alone or in combination with one or more of the first through twenty-second aspects, the spatial parameter includes at least one of a precoder, a quasi co-location (QCL) relationship, a transmission configuration indication (TCI) state, or a combination thereof.

In a twenty-fourth aspect, alone or in combination with one or more of the first through twenty-third aspects, using the transmission parameter to transmit the PDCCH communication comprises transmitting the PDCCH communication using the spatial parameter.

In a twenty-fifth aspect, alone or in combination with one or more of the first through twenty-fourth aspects, the configuration information indicates a first spatial parameter for PDCCH communications that schedule RARs having a first RAR type, and a second spatial parameter for PDCCH communications that schedule RARs having a second RAR type.

In a twenty-sixth aspect, alone or in combination with one or more of the first through twenty-fifth aspects, the transmission parameter is associated with a transmission scheme for differentiating between different RAR types.

In a twenty-seventh aspect, alone or in combination with one or more of the first through twenty-sixth aspects, multiple RAR type differentiation schemes are used concurrently for RAR transmissions based on the random access message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
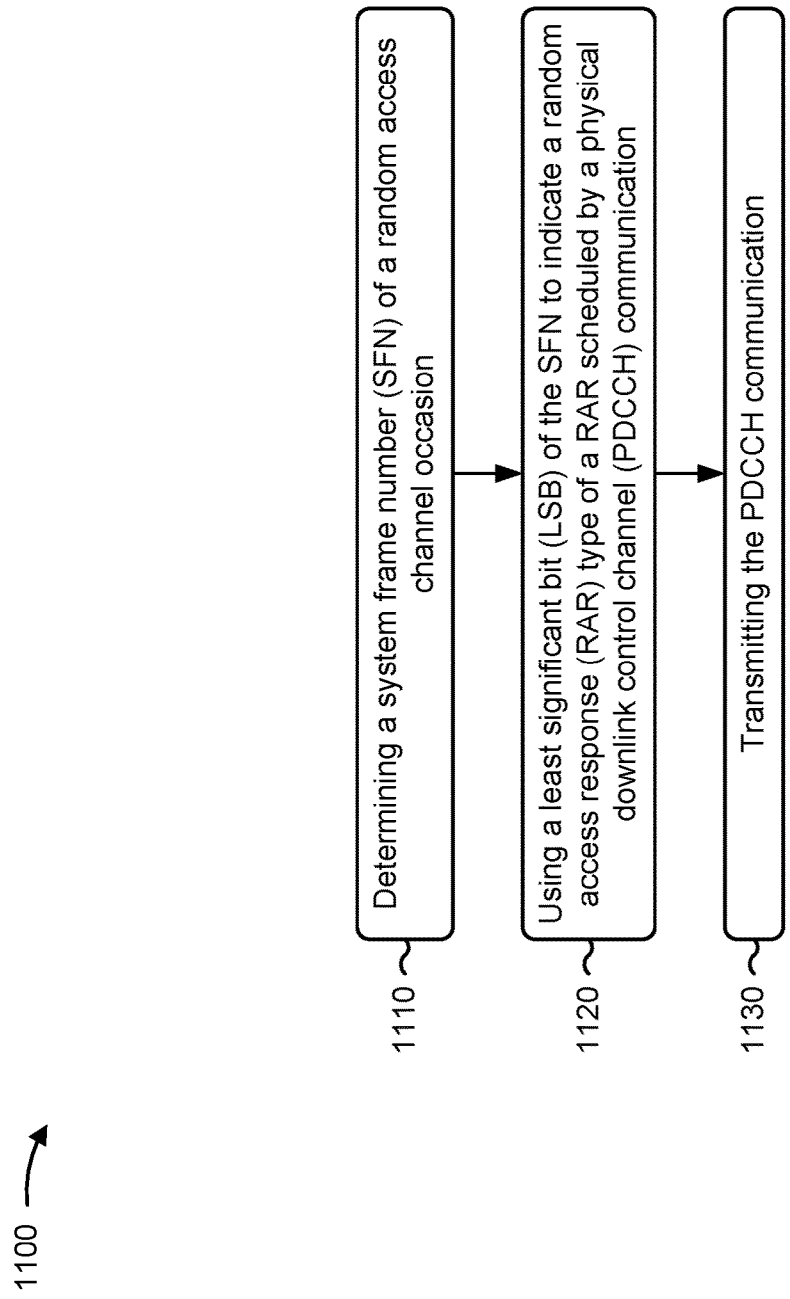

FIG. 11 is a diagram illustrating an example process 1100 performed, for example, by a base station, in accordance with various aspects of the present disclosure. Example process 1100 is an example where the base station (e.g., base station 110 and/or the like) performs operations associated with random access response type differentiation.

As shown in FIG. 11, in some aspects, process 1100 may include determining an SFN of a random access channel occasion (block 1110). For example, the base station (e.g., using transmit processor 220, receive processor 238, controller/processor 240, memory 242, and/or the like) may determine an SFN of a random access channel occasion, as described above.

As further shown in FIG. 11, in some aspects, process 1100 may include using an LSB of the SFN to indicate a RAR type of a RAR scheduled by a PDCCH communication (block 1120). For example, the base station (e.g., using transmit processor 220, receive processor 238, controller/processor 240, memory 242, and/or the like) may use an LSB of the SFN to indicate a RAR type of a RAR scheduled by a PDCCH communication, as described above.

As further shown in FIG. 11, in some aspects, process 1100 may include transmitting the PDCCH communication (block 1130). For example, the base station (e.g., using transmit processor 220, receive processor 238, controller/processor 240, memory 242, and/or the like) may transmit the PDCCH communication, as described above.

Process 1100 may include additional aspects, such as any single aspect or any combination of aspects described below and/or in connection with one or more other processes described elsewhere herein.

In a first aspect, the RAR type is message B of a 2-step RACH procedure.

In a second aspect, alone or in combination with the first aspect, using the LSB of the SFN to indicate the RAR type comprises scrambling the PDCCH communication using a random access radio network temporary identifier generated based at least in part on the LSB of the SFN.

In a third aspect, alone or in combination with one or more of the first and second aspects, using the LSB of the SFN to indicate the RAR type comprises including the LSB of the SFN in a field included in DCI of the PDCCH communication.

In a fourth aspect, alone or in combination with one or more of the first through third aspects, using the LSB of the SFN to indicate the RAR type comprises indicating a value of the LSB of the SFN using at least one of a DMRS scrambling identifier used for the PDCCH communication, a DCI scrambling identifier used for the PDCCH communication, an interleaving pattern used for the PDCCH communication, or a combination thereof.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting a random access message associated with a random access response (RAR) type; and
    using a transmission parameter to obtain a physical downlink control channel (PDCCH) communication after transmitting the random access message, wherein:
        the PDCCH communication is associated with a RAR having the RAR type,
        the transmission parameter includes a cyclic redundancy check (CRC) mask for the PDCCH communication or a control resource set (CORESET) configuration associated with the PDCCH communication, and
        the transmission parameter is used to differentiate among different RAR types.

2. The method of claim 1, further comprising obtaining or refraining from obtaining a physical downlink shared channel (PDSCH) communication, scheduled by the PDCCH communication, based at least in part on whether the PDCCH communication is successfully obtained using the transmission parameter, wherein obtaining or refraining from obtaining the PDSCH communication comprises obtaining the PDSCH communication if the PDCCH communication is successfully received using the transmission parameter, or refraining from obtaining the PDSCH communication if the PDCCH communication is not successfully received using the transmission parameter.

3. The method of claim 1, wherein different RAR types are associated with at least one of different random access modes, different UE capabilities, different priorities, different lengths of a RAR window, or a combination thereof.

4. The method of claim 1, wherein the RAR is one of multiple RARs, having different RAR types, that are transmitted concurrently, using different RAR type differentiation schemes, based on the random access message.

5. The method of claim 1, wherein using the transmission parameter to obtain the PDCCH communication comprises using the CRC mask to perform a CRC for the PDCCH communication.

6. The method of claim 1, further comprising receiving configuration information that indicates a first set of CRC masks for PDCCH communications that schedule RARs having a first RAR type, and a second set of CRC masks for PDCCH communications that schedule RARs having a second RAR type.

7. The method of claim 6, wherein the first set of CRC masks and the second set of CRC masks are mutually exclusive.

8. The method of claim 1, wherein the transmission parameter further includes a search space (SS) configuration associated with the PDCCH communication.

9. The method of claim 8, wherein using the transmission parameter to obtain the PDCCH communication comprises monitoring at least one of a CORESET configured according to the CORESET configuration or an SS configured according to the SS configuration for the PDCCH communication associated with the RAR type.

10. The method of claim 1, further comprising receiving configuration information that indicates a first CORESET configuration or a first search space configuration for PDCCH communications that schedule RARs having a first RAR type, and a second CORESET configuration or a second search space configuration for PDCCH communications that schedule RARs having a second RAR type.

11. The method of claim 1, wherein the transmission parameter is associated with a transmission scheme for differentiating between different RAR types.

12. A method of wireless communication performed by a user equipment (UE), comprising:
    determining a system frame number (SFN) of a random access channel occasion;
    using a least significant bit (LSB) of the SFN to identify a random access response (RAR) type of a RAR scheduled by a physical downlink control channel (PDCCH) communication; and
    obtaining the PDCCH communication or performing early termination of reception of the PDCCH communication based at least in part on the RAR type.

13. The method of claim 12, wherein the RAR type is message B of a 2-step random access channel (RACH) procedure.

14. The method of claim 12, wherein using the LSB of the SFN to identify the RAR type comprises:
    descrambling the PDCCH communication using a random access radio network temporary identifier generated based at least in part on the LSB of the SFN; and
    identifying the RAR type based at least in part on whether the descrambling is successful.

15. The method of claim 12, wherein using the LSB of the SFN to identify the RAR type comprises:
    comparing the LSB of the SFN to a field included in downlink control information (DCI) of the PDCCH communication; and
    identifying the RAR type based at least in part on the comparison.

16. A method of wireless communication performed by a base station, comprising:
    receiving a random access message associated with a random access response (RAR) type; and
    using a transmission parameter to transmit a physical downlink control channel (PDCCH) communication after receiving the random access message, wherein:
        the PDCCH communication is associated with a RAR having the RAR type,
        the transmission parameter includes a cyclic redundancy check (CRC) mask for the PDCCH communication or a control resource set (CORESET) configuration associated with the PDCCH communication, and
        wherein the transmission parameter is used to differentiate among different RAR types.

17. The method of claim 16, wherein different RAR types are associated with at least one of different random access modes, different UE capabilities, different priorities, different lengths of a RAR window, or a combination thereof.

18. The method of claim 16, wherein multiple RAR type differentiation schemes are used concurrently for RAR transmissions based on the random access message.

19. The method of claim 16, wherein using the transmission parameter to transmit the PDCCH communication comprises using the CRC mask to perform CRC masking of a CRC for the PDCCH communication.

20. The method of claim 16, further comprising transmitting configuration information that indicates a first set of CRC masks for PDCCH communications that schedule RARs having a first RAR type, and a second set of CRC masks for PDCCH communications that schedule RARs having a second RAR type.

21. The method of claim 20, wherein the first set of CRC masks and the second set of CRC masks are mutually exclusive.

22. The method of claim 16, wherein the transmission parameter further includes a search space (SS) configuration associated with the PDCCH communication.

23. The method of claim 22, wherein using the transmission parameter to transmit the PDCCH communication comprises transmitting the PDCCH communication associated with the RAR type in at least one of a CORESET configured according to the CORESET configuration or an SS configured according to the SS configuration.

24. The method of claim 16, further comprising transmitting configuration information that indicates a first CORESET configuration or a first search space configuration for PDCCH communications that schedule RARs having a first RAR type, and a second CORESET configuration or a second search space configuration for PDCCH communications that schedule RARs having a second RAR type.

25. The method of claim 16, wherein the transmission parameter is associated with a transmission scheme for differentiating between different RAR types.

26. A method of wireless communication performed by a base station, comprising:
    determining a system frame number (SFN) of a random access channel occasion;
    using a least significant bit (LSB) of the SFN to indicate a random access response (RAR) type of a RAR scheduled by a physical downlink control channel (PDCCH) communication; and
    transmitting the PDCCH communication.

27. The method of claim 26, wherein the RAR type is message B of a 2-step random access channel (RACH) procedure.

28. The method of claim 26, wherein using the LSB of the SFN to indicate the RAR type comprises at least one of:
    scrambling the PDCCH communication using a random access radio network temporary identifier generated based at least in part on the LSB of the SFN, or including the LSB of the SFN in a field included in downlink control information (DCI) of the PDCCH communication.

29. The method of claim 1, further comprising:
receiving random access channel (RACH) configuration information, wherein the transmission parameter is used based at least in part on receiving the RACH configuration information.

30. The method of claim 29, wherein the RACH configuration information indicates a first transmission parameter corresponding to a first RAR type and a second transmission parameter corresponding to a second RAR type, and wherein the transmission parameter comprises the first transmission parameter or the second transmission parameter.

* * * * *